(12) United States Patent
Sato et al.

(10) Patent No.: US 9,791,678 B2
(45) Date of Patent: Oct. 17, 2017

(54) ZOOM LENS, IMAGING DEVICE AND METHOD FOR MANUFACTURING THE ZOOM LENS

(75) Inventors: Haruo Sato, Kawaguchi (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/991,975

(22) PCT Filed: Nov. 10, 2011

(86) PCT No.: PCT/JP2011/006279
§ 371 (c)(1),
(2), (4) Date: Jun. 6, 2013

(87) PCT Pub. No.: WO2012/077278
PCT Pub. Date: Jun. 14, 2012

(65) Prior Publication Data
US 2013/0250424 A1    Sep. 26, 2013

(30) Foreign Application Priority Data

Dec. 7, 2010   (JP) .................................. 2010-272909
Mar. 1, 2011   (JP) .................................. 2011-043447

(51) Int. Cl.
G02B 27/00   (2006.01)
G02B 15/14   (2006.01)
G02B 9/34    (2006.01)
G02B 13/18   (2006.01)
(Continued)

(52) U.S. Cl.
CPC ................ *G02B 15/14* (2013.01); *G02B 1/11* (2013.01); *G02B 9/34* (2013.01); *G02B 13/18* (2013.01); *G02B 15/173* (2013.01); *Y10T 29/49826* (2015.01)

(58) Field of Classification Search
CPC ...... G02B 13/00; G02B 13/001; G02B 15/10; G02B 15/14; G02B 1/11
USPC ....... 359/577, 580, 581, 601, 644, 676, 689, 359/687, 708, 713, 715, 738, 745, 746,
(Continued)

(56) References Cited

U.S. PATENT DOCUMENTS 4,439,017 A * 3/1984 Yamaguchi .................. 359/687
4,641,928 A * 2/1987 Hamanishi ................... 359/687
4,740,063 A   4/1988 Itoh et al.
(Continued)

FOREIGN PATENT DOCUMENTS

JP    60-060617 A    4/1985
JP    03-075712 A    3/1991
(Continued)

*Primary Examiner* — Bumsuk Won
*Assistant Examiner* — Balram Parbadia
(74) *Attorney, Agent, or Firm* — Shapiro, Gabor and Rosenberger, PLLC

(57) ABSTRACT

A zoom lens has, in order from an object: a first lens group having positive refractive power; a second lens group having negative refractive power; a third lens group having positive refractive power; and a fourth lens group having positive refractive power. Zooming is performed by changing an air gap between the lens groups. The fourth lens group includes, in order from the object, a first positive lens component, a second positive lens component having a convex surface facing the object, and a negative lens component. A specified conditional expression is satisfied.

26 Claims, 19 Drawing Sheets

(51) Int. Cl.
*G02B 15/173* (2006.01)
*G02B 1/11* (2015.01)

(58) Field of Classification Search
USPC ....... 359/747, 749–756, 760, 765, 769, 771, 359/772, 774
See application file for complete search history.

(56) References Cited

U.S. PATENT DOCUMENTS

| | | | |
|---|---|---|---|
| 5,309,284 A * | 5/1994 | Nakatsuji | 359/687 |
| 5,412,507 A * | 5/1995 | Sato | G02B 15/173 359/687 |
| 5,546,231 A * | 8/1996 | Sato | 359/687 |
| 7,253,965 B2 | 8/2007 | Shibayama et al. | |
| 2003/0002171 A1 * | 1/2003 | Sato | 359/687 |
| 2004/0070844 A1 * | 4/2004 | Sato | G02B 27/646 359/687 |
| 2006/0072213 A1 | 4/2006 | Shibayama et al. | |
| 2007/0223103 A1 | 9/2007 | Yamamoto | |
| 2008/0007646 A1 * | 1/2008 | Satori et al. | 348/360 |
| 2008/0218876 A1 * | 9/2008 | Take | G02B 15/173 359/687 |
| 2008/0231962 A1 | 9/2008 | Yamada | |
| 2008/0247049 A1 | 10/2008 | Inoko | |
| 2009/0296231 A1 * | 12/2009 | Shirasuna | G02B 15/173 359/687 |

FOREIGN PATENT DOCUMENTS

| | | | |
|---|---|---|---|
| JP | 06-300967 A | 10/1994 | |
| JP | 2006-106191 A | 4/2006 | |
| JP | 2007-256424 A | 10/2007 | |
| JP | 2008-046259 A | 2/2008 | |
| JP | 2008-233585 A | 10/2008 | |
| JP | 2008-257005 A | 10/2008 | |
| JP | 2010-271362 A | 12/2010 | |
| JP | 2010271362 A * | 12/2010 | G02B 15/20 |

* cited by examiner

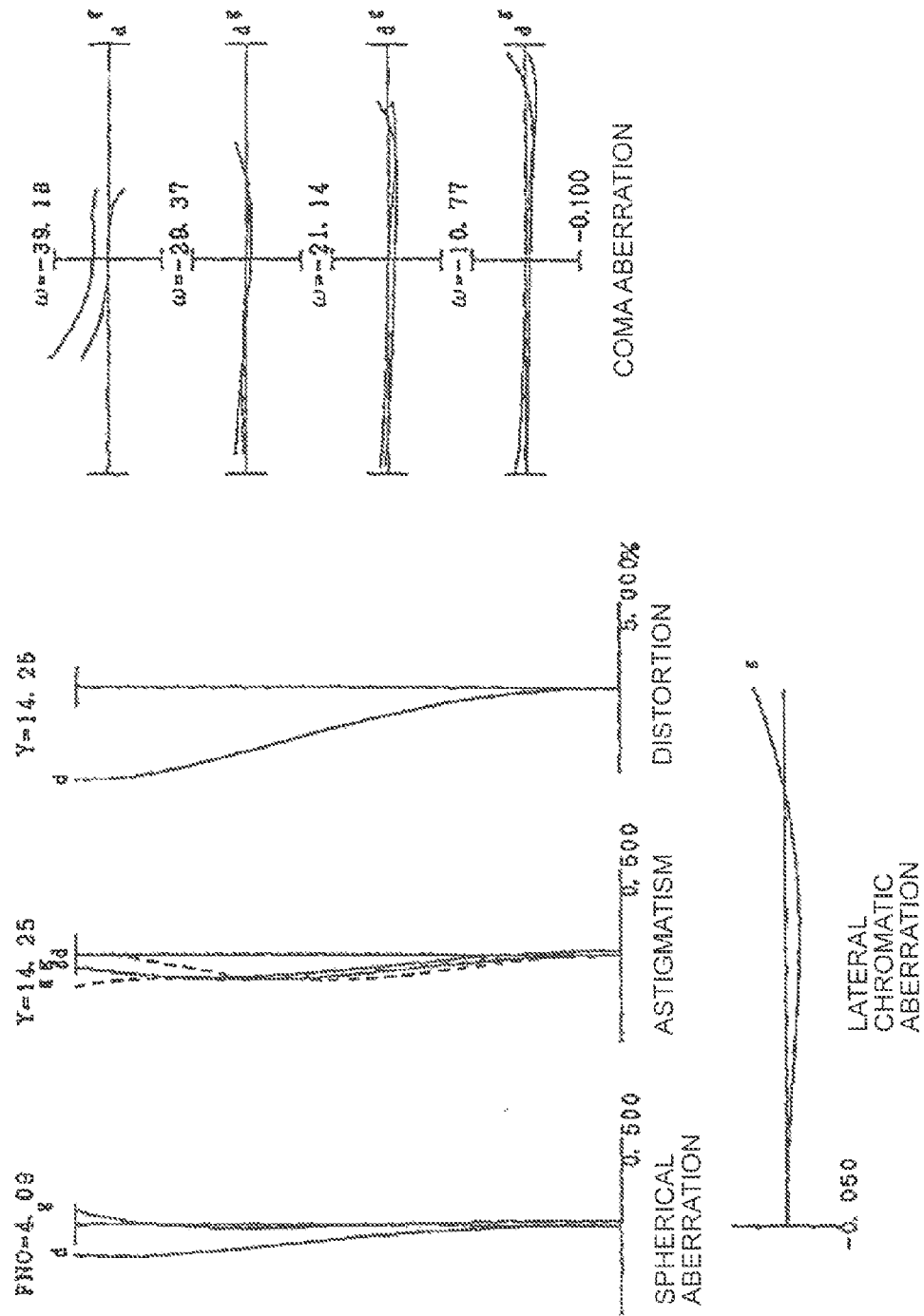

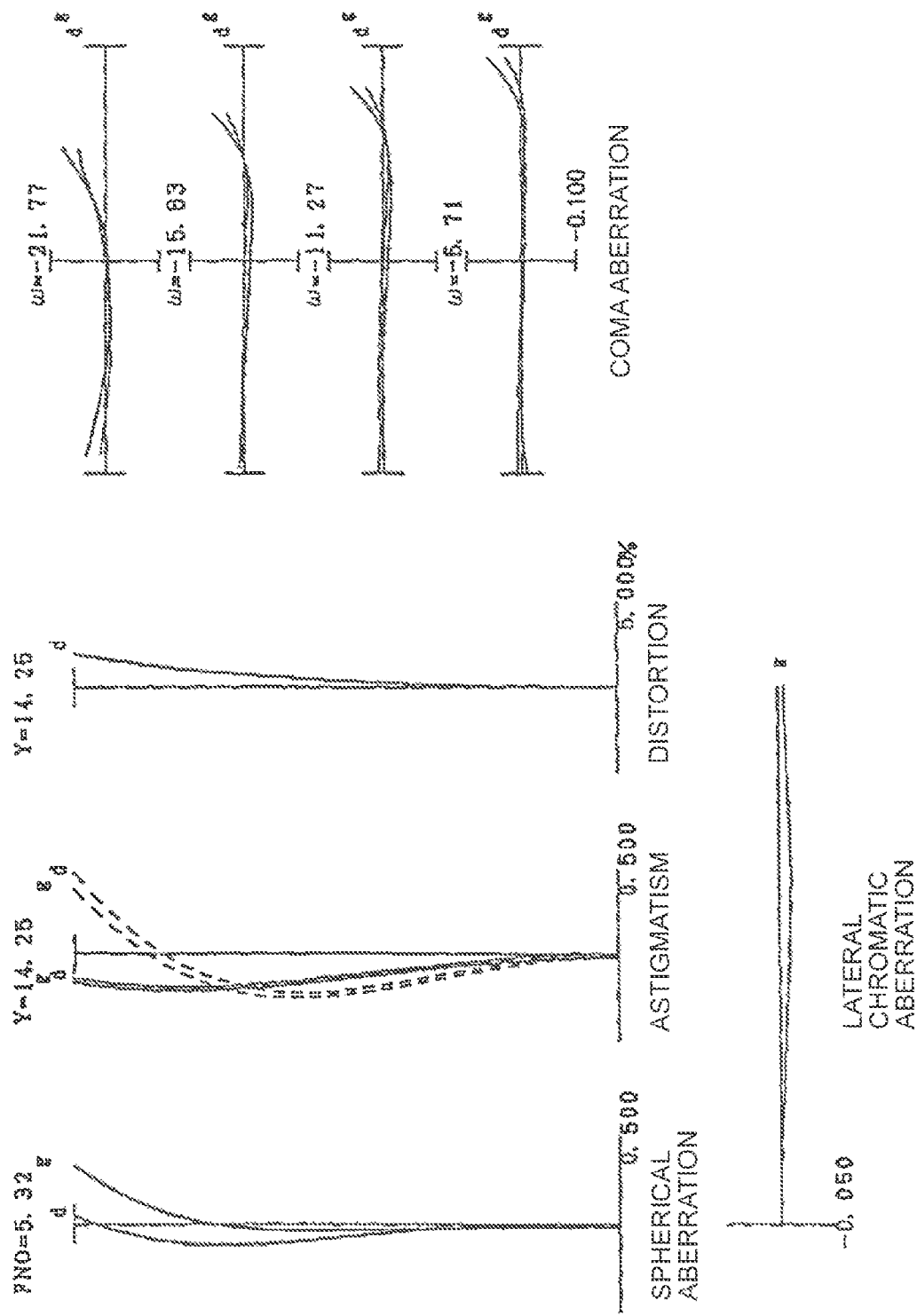

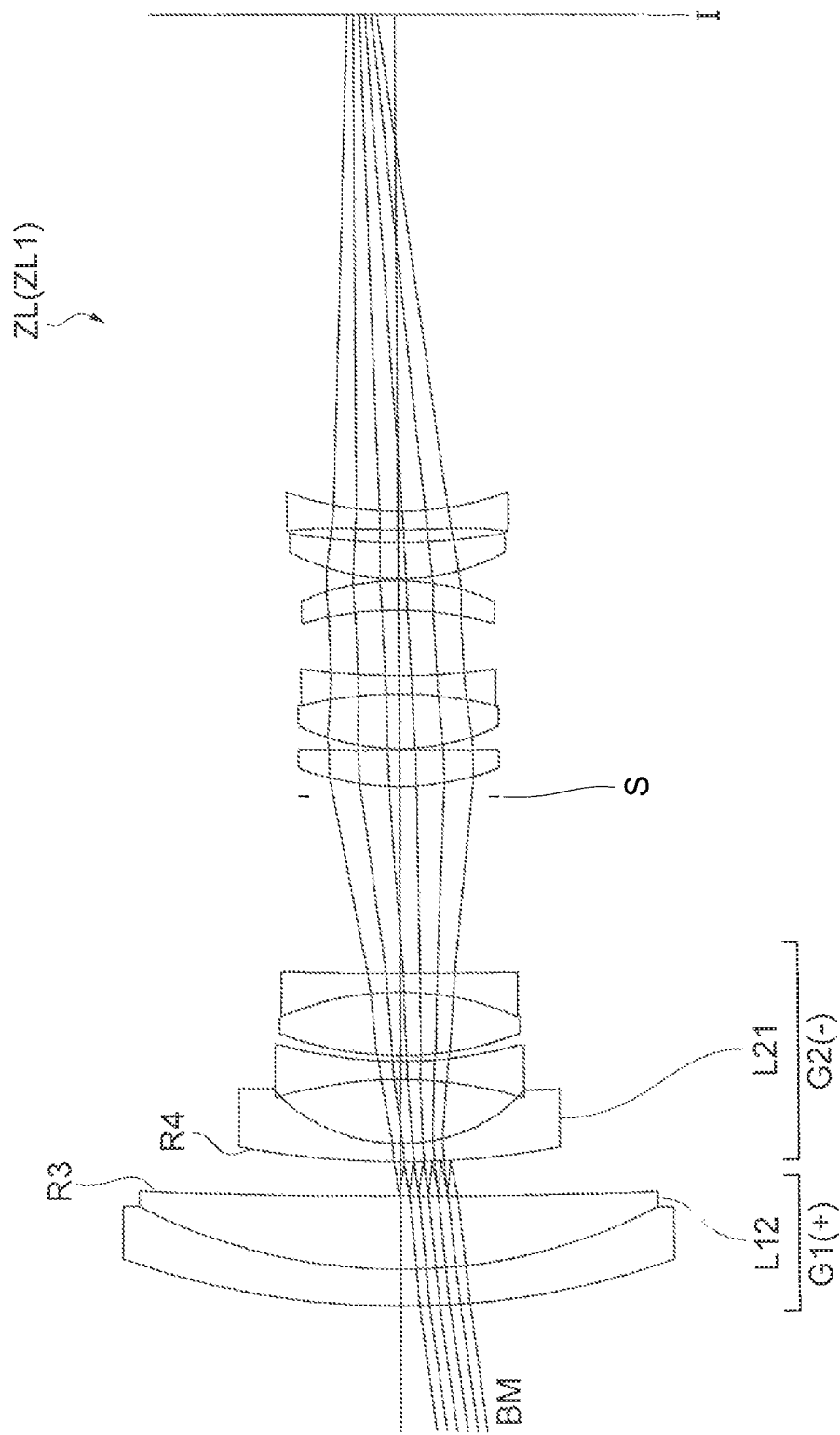

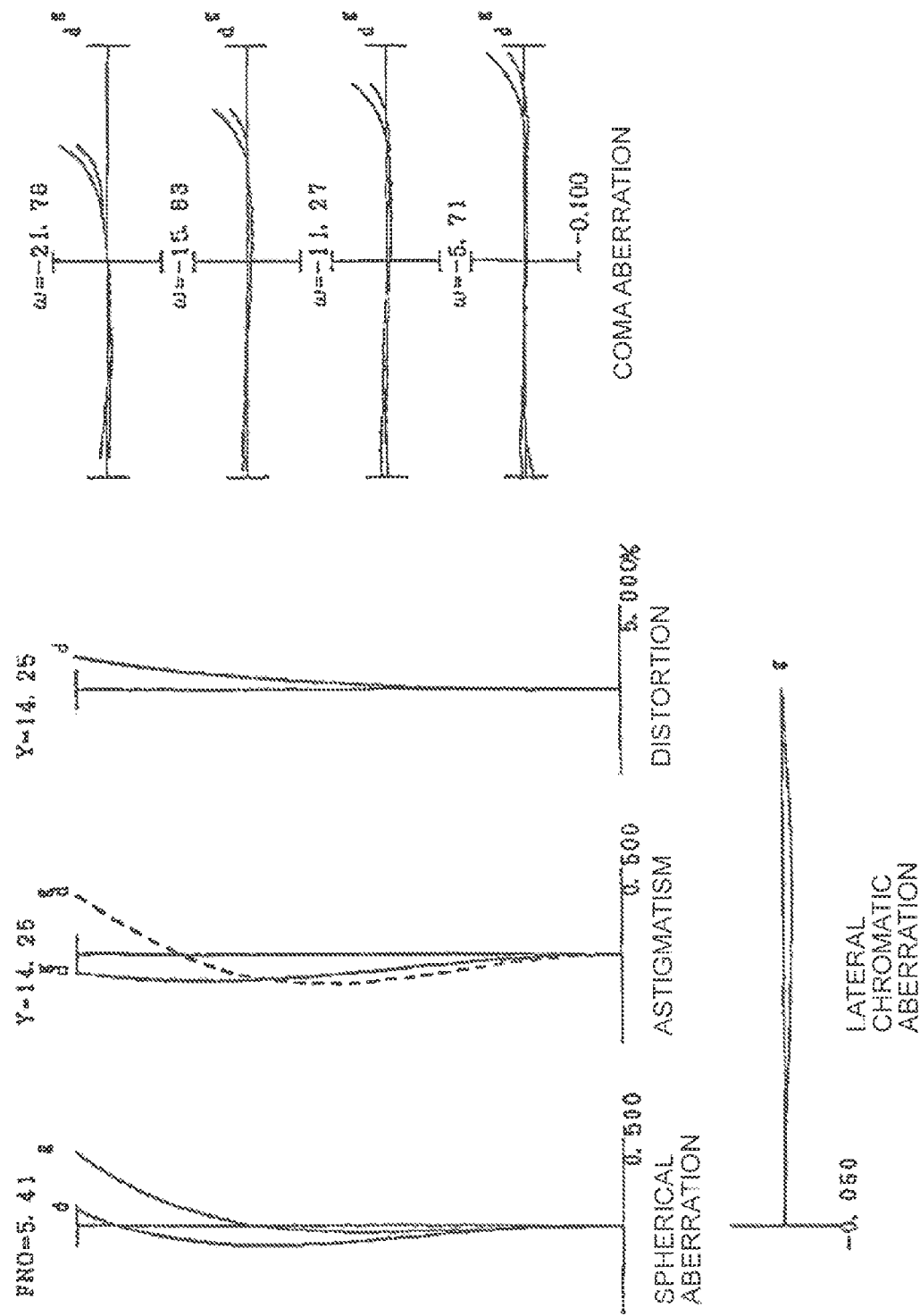

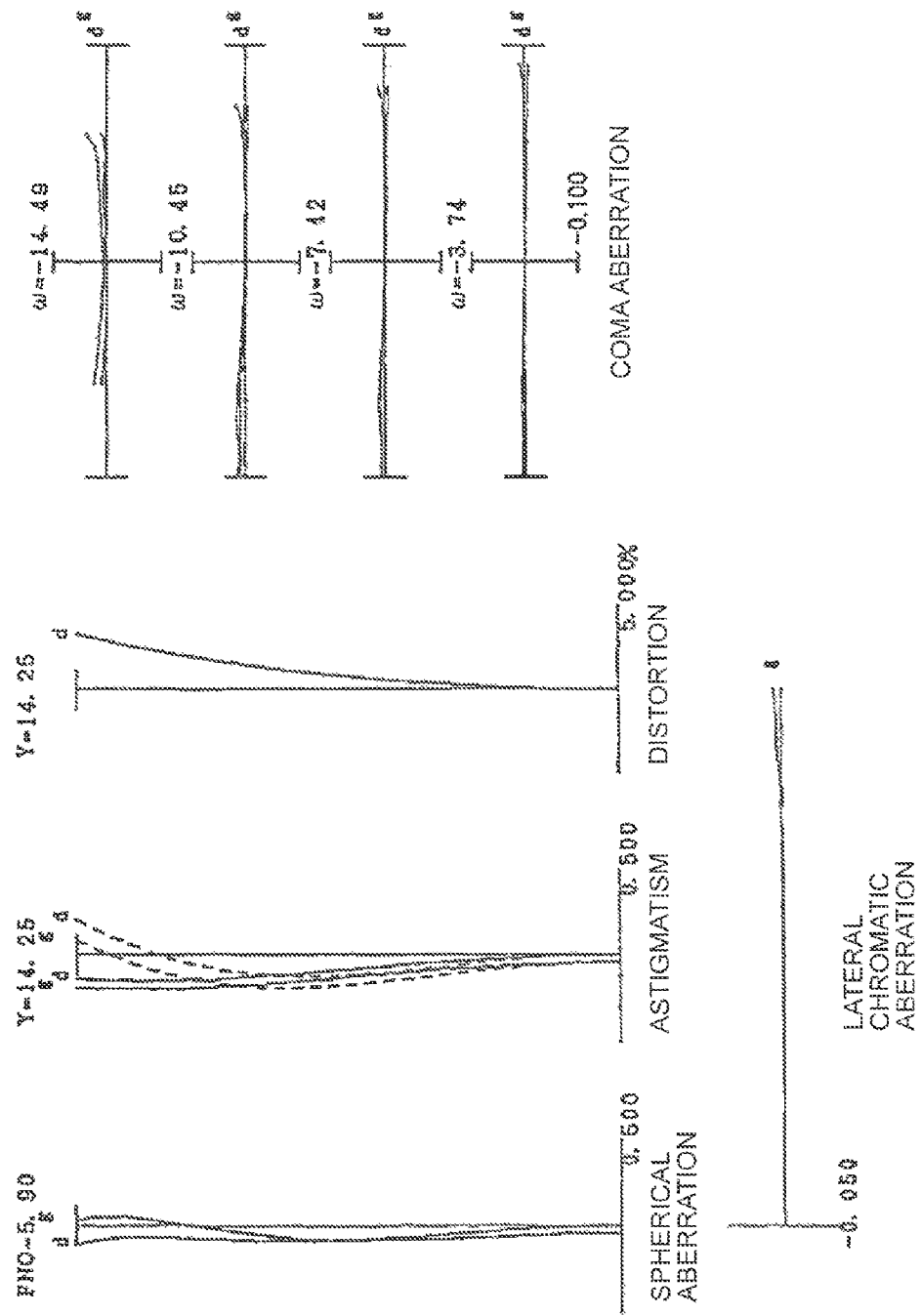

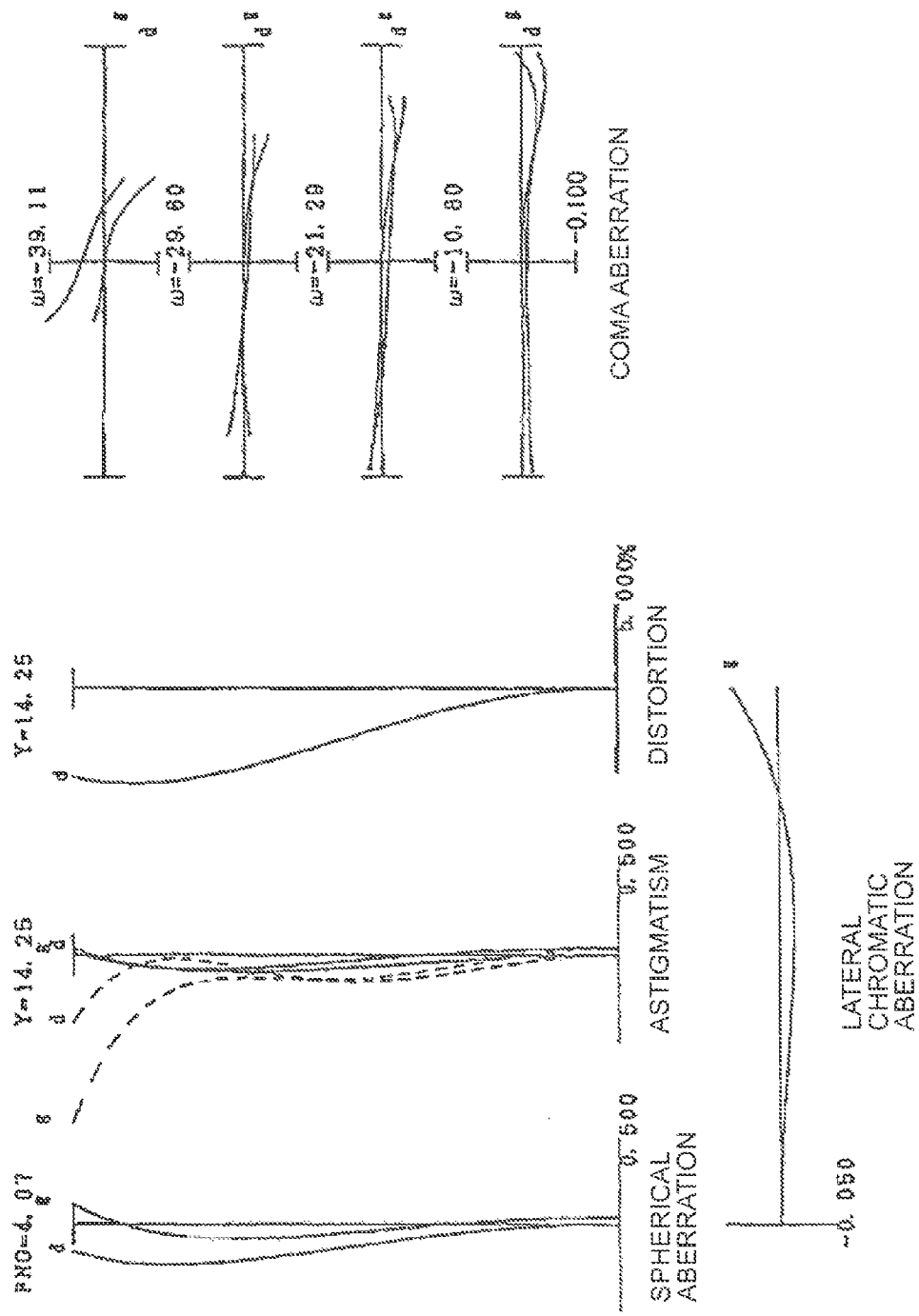

ZOOM LENS, IMAGING DEVICE AND METHOD FOR MANUFACTURING THE ZOOM LENS

TECHNICAL FIELD

The present invention relates to a zoom lens, an imaging device and a method for manufacturing the zoom lens.

TECHNICAL BACKGROUND

A miniaturized zoom lens has been conventionally proposed (e.g. see Patent Document 1).

PRIOR ARTS LIST

Patent Document

Patent Document 1: Japanese Laid-Open Patent Publication No. H3-75712 (A)

SUMMARY OF THE INVENTION

Problems to be Solved by the Invention

Conventional zoom lenses, however, are insufficient in terms of miniaturization. If refractive power of each lens group is increased in order to implement miniaturization and higher performance, lens configuration becomes complicated because of the necessity of correcting aberrations and the number of constituting lenses increases, resulting in an increase in the size of the zoom lens, which is the opposite of the intention.

With the foregoing in view, it is an object of the present invention to provide a zoom lens which is miniaturized, constituted by a small number of lenses, has high performance and little aberrations, an imaging device including this zoom lens, and a method for manufacturing this zoom lens.

Means to Solve the Problems

A zoom lens according to a first aspect includes, in order from an object: a first lens group having positive refractive power; a second lens group having negative refractive power; a third lens group having positive refractive power; and a fourth lens group having positive refractive power, wherein zooming is performed by changing an air gap between the lens groups, the fourth lens group includes, in order from the object, a first positive lens component, a second positive lens component having a convex surface facing the object, and a negative lens component, and the following conditional expression is satisfied.

$$0.00 < (Rb2-Rb1)/(Rb2+Rb1) < 1.00$$

where $Rb2$ denotes a radius of curvature of an image side surface of the second positive lens component which constitutes the fourth lens group and has the convex surface facing the object, and $Rb1$ denotes a radius of curvature of an object side surface of the second positive lens component which constitutes the fourth lens group and has the convex surface facing the object.

In this case, a lens component refers to a single lens or a cemented lens in which a plurality of lenses is cemented together.

An imaging device (e.g. mirrorless camera 1 in this embodiment) according to a second aspect has the zoom lens according to the first aspect.

A method for manufacturing a zoom lens according to a third aspect is a method for manufacturing a zoom lens including, in order from an object, a first lens group having positive refractive power, a second lens group having negative refractive power, a third lens group having positive refractive power and a fourth lens group having positive refractive power, wherein zooming is performed by changing an air gap between the lens groups, the fourth lens group includes, in order from the object, a first positive lens component, a second positive lens component having a convex surface facing the object, and a negative lens component, and the following conditional expression is satisfied.

$$0.00 < (Rb2-Rb1)/(Rb2+Rb1) < 1.00$$

where $Rb2$ denotes a radius of curvature of an image side surface of the second positive lens component which constitutes the fourth lens group and has the convex surface facing the object, and $Rb1$ denotes a radius of curvature of an object side surface of the second positive lens component which constitutes the fourth lens group and has the convex surface facing the object.

Advantageous Effects of the Invention

According to the present invention, a zoom lens which is miniaturized, constituted by a small number of lenses, has high performance and little aberrations, an imaging device including this zoom lens, and a method for manufacturing this zoom lens can be provided.

BRIEF DESCRIPTION THE DRAWINGS

FIG. 1 shows a configuration of a zoom lens according to Example 1 and a zoom track from a wide-angle end state (W) to a telephoto end state (T);

FIG. 2 are graphs showing various aberrations of the zoom lens according to Example 1, where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state;

FIG. 3 is a cross-sectional view showing the configuration of the zoom lens according to Example 1, describing an example of a state when an entered beam is reflected by a first ghost generating surface and a second ghost generating surface;

Figure 5A:
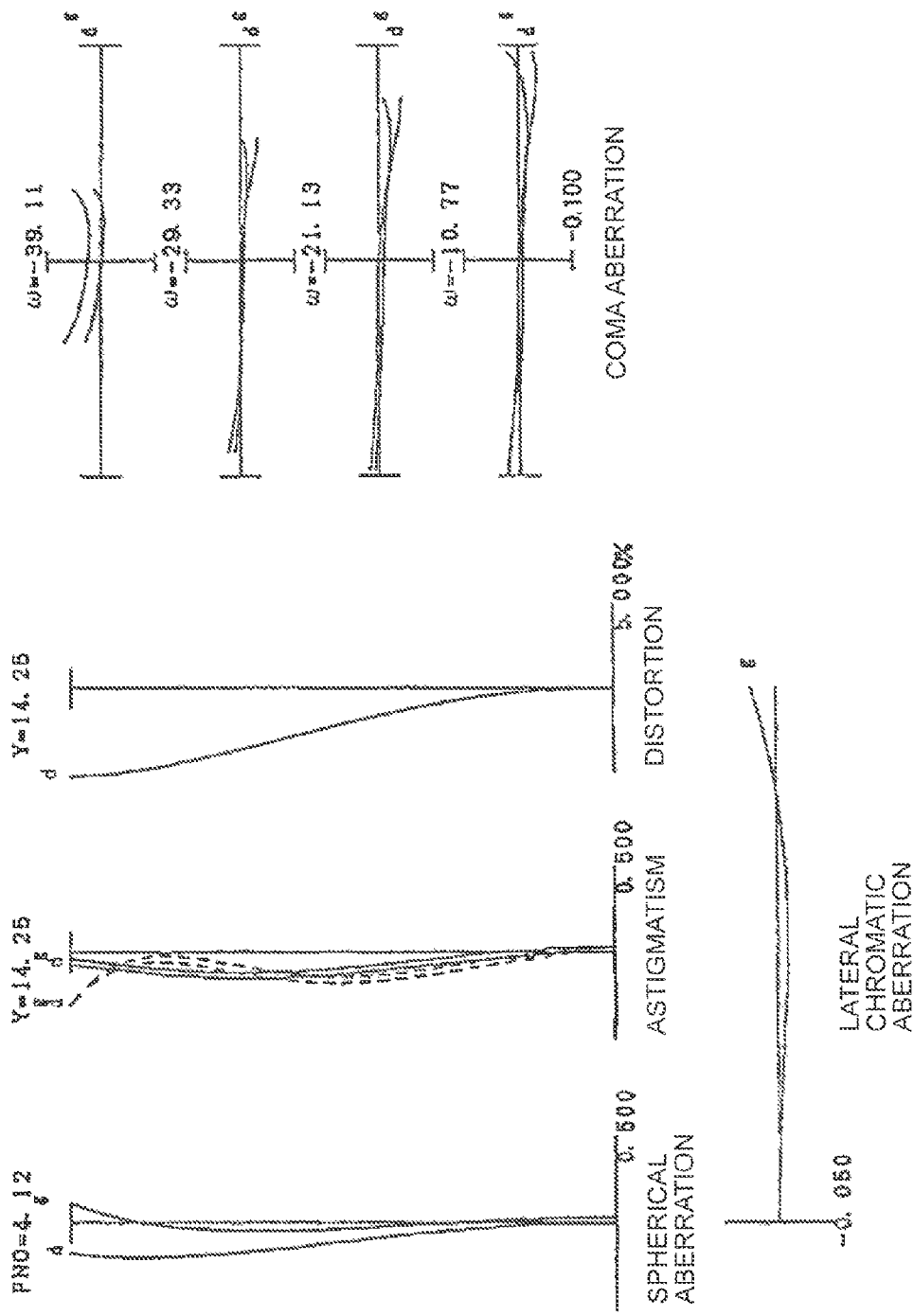
Figure 6:
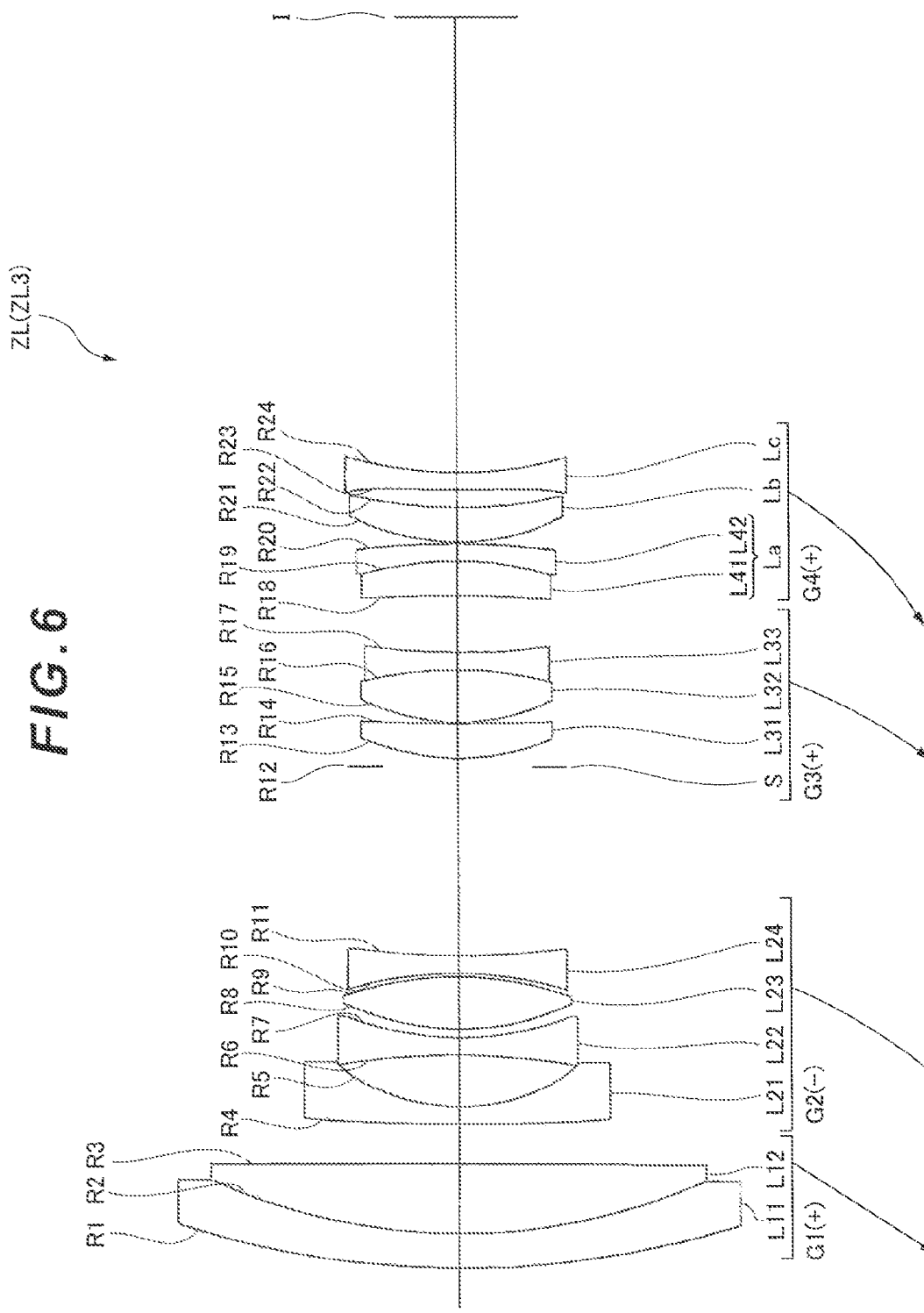
Figure 7B:
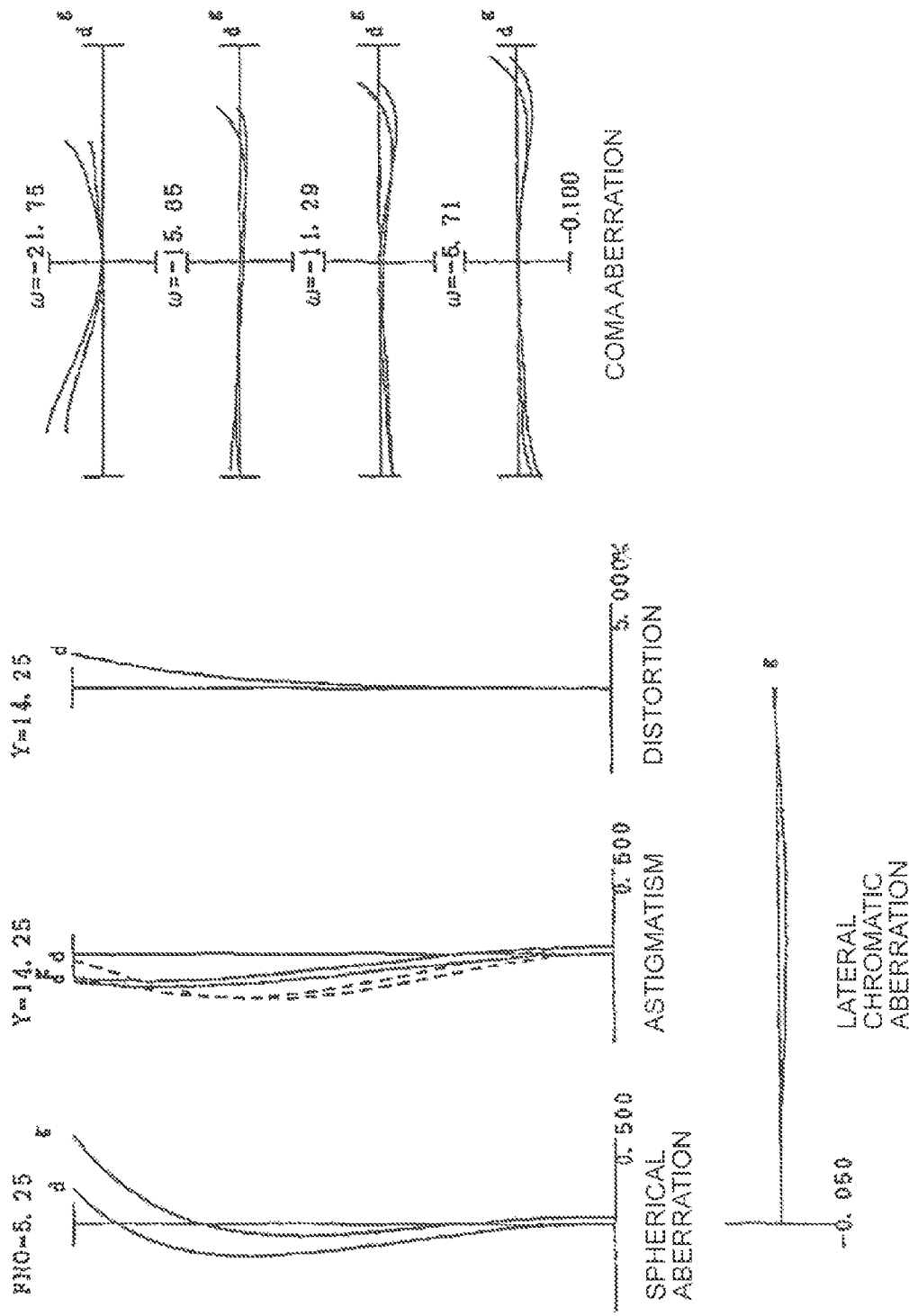
Figure 7C:
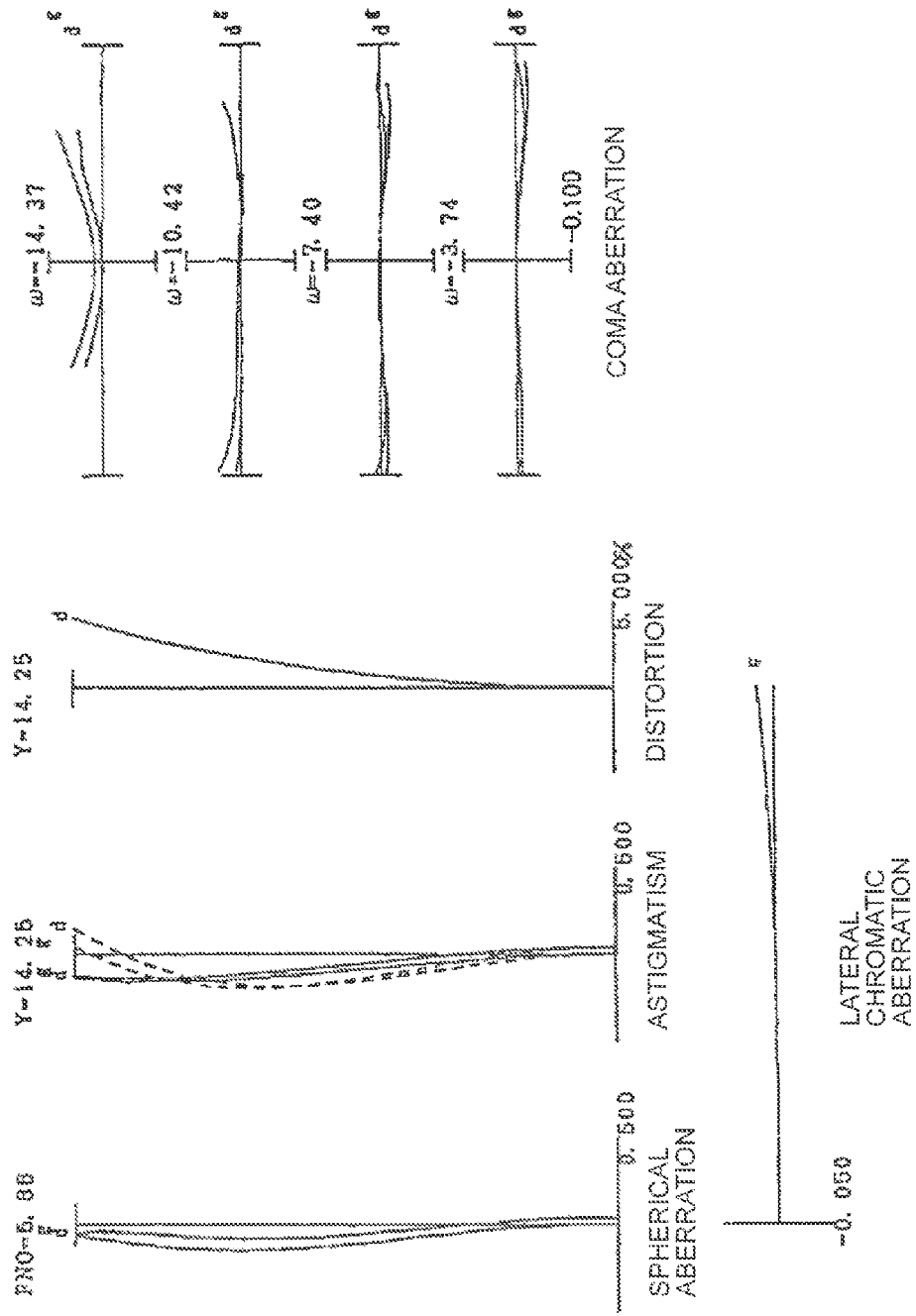
Figure 8:
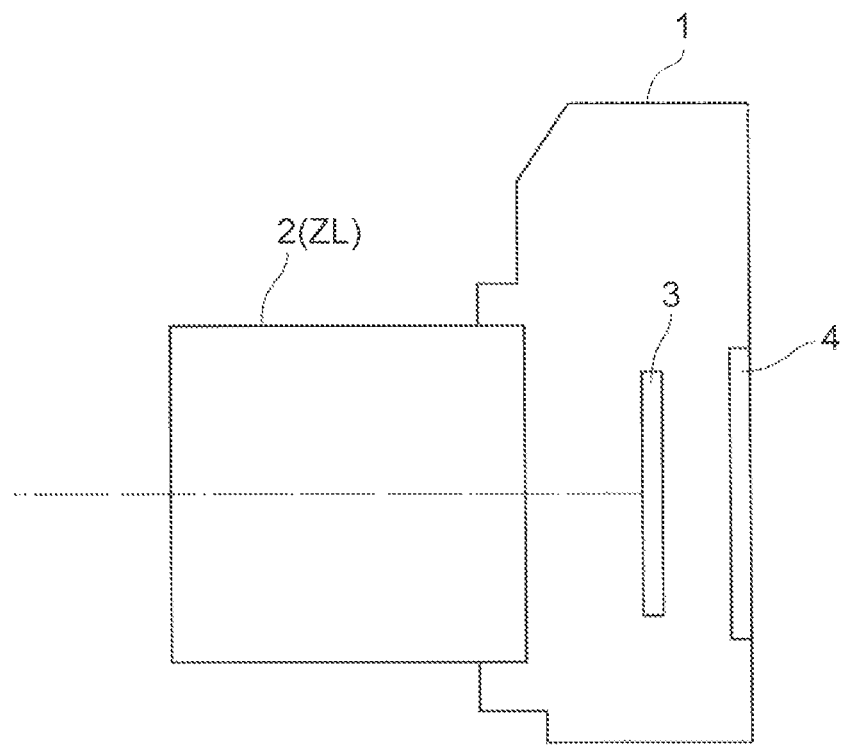
Figure 9:
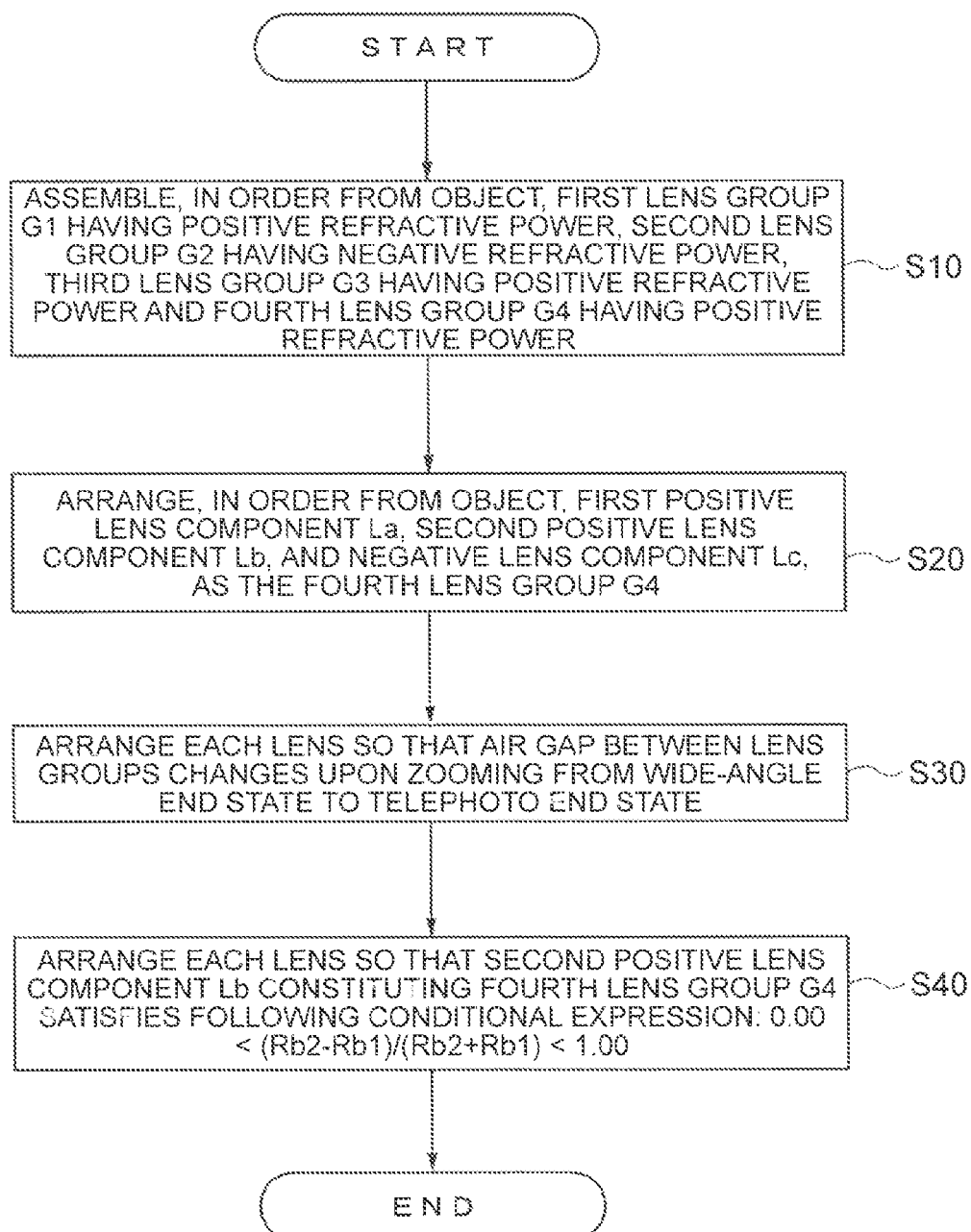
Figure 10:
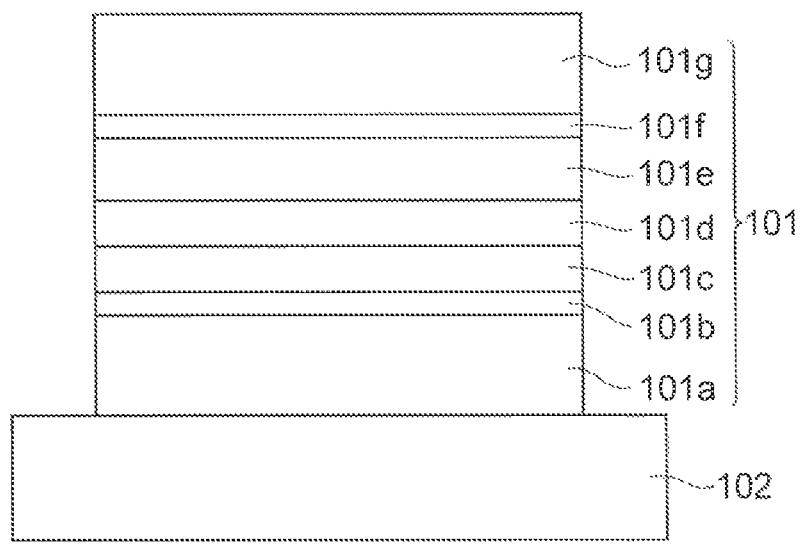
Figure 11:
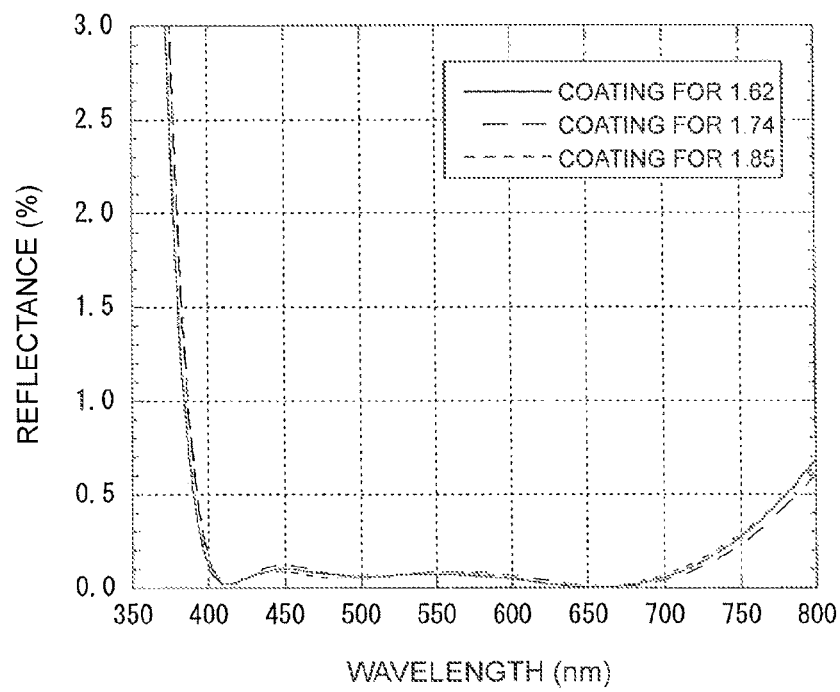
Figure 12:
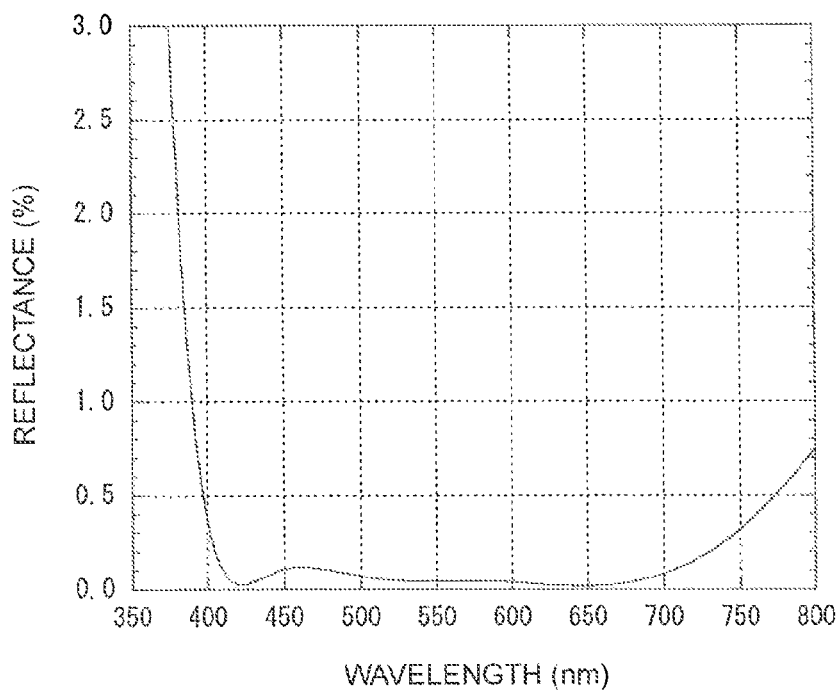
Figure 13:
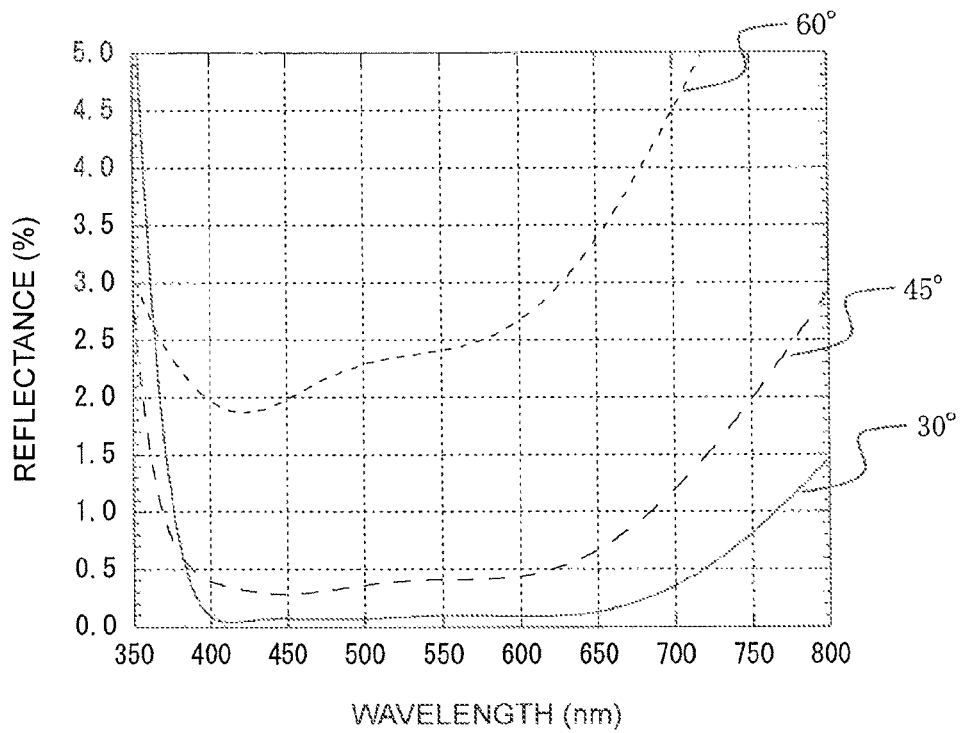
Figure 14:
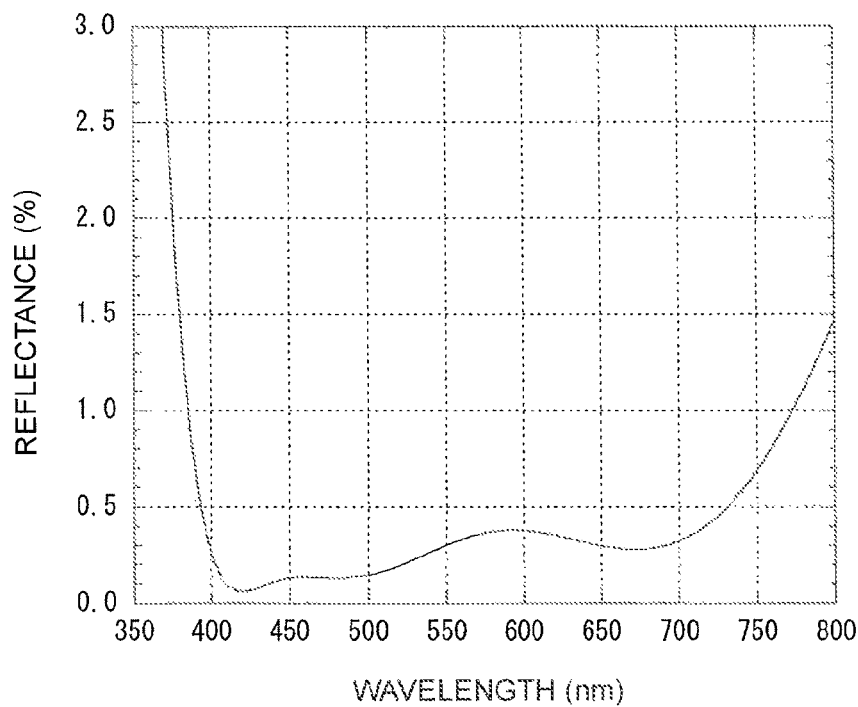
Figure 15:
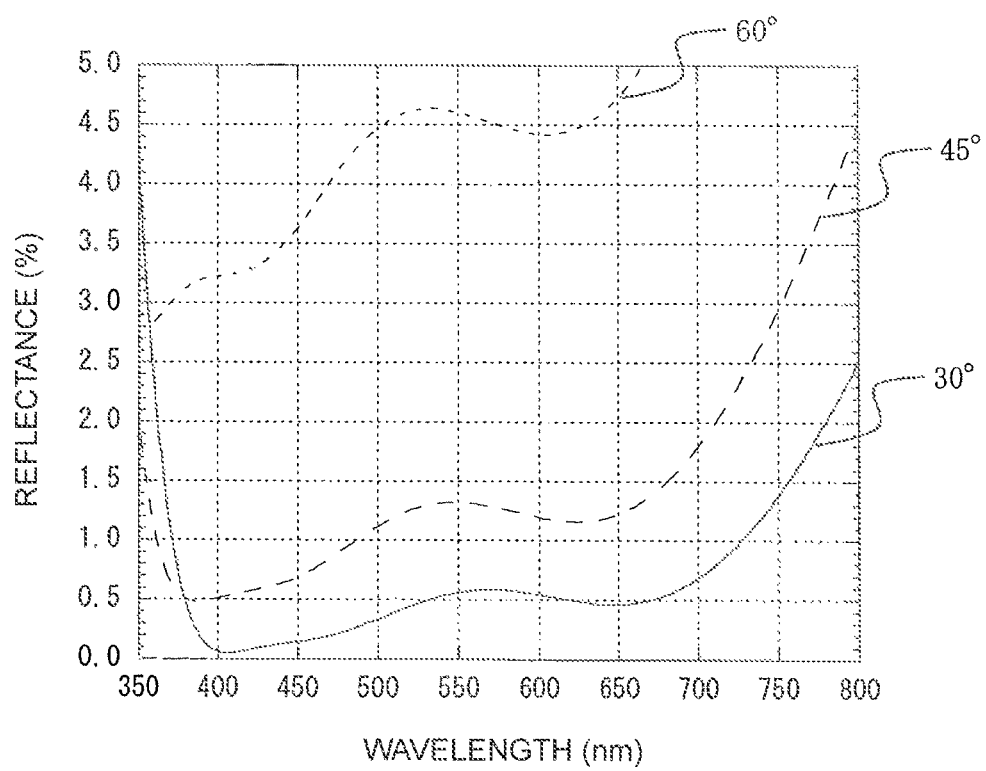

FIG. 5 are graphs showing various aberrations of the zoom lens according to Example 2, where FIG. 5A are graphs showing various aberrations of the zoom lens upon focusing on infinity in the wide-angle end state, FIG. 5B are graphs showing various aberrations of the zoom lens upon focusing on infinity in the intermediate focal length state, and FIG. 5C are graphs showing various aberrations of the zoom lens upon focusing on infinity in the telephoto end state;

FIG. 6 shows a configuration of a zoom lens according to Example 3 and a zoom track from a wide-angle end state (W) to a telephoto end state (T);

FIG. 7 are graphs showing various aberrations of the zoom lens according to Example 3, where FIG. 7A are graphs showing various aberrations of the zoom lens upon focusing on infinity in the wide-angle end state, FIG. 7B are graphs showing various aberrations of the zoom lens upon focusing on infinity in the intermediate focal length state, and FIG. 7C are graphs showing various aberrations of the zoom lens upon focusing on infinity in the telephoto end state;

FIG. 8 is a cross-sectional view showing a configuration of a camera according to the present embodiment;

FIG. 9 is a flow chart depicting a method for manufacturing the zoom lens according to the present embodiment;

FIG. 10 is a diagram showing an example of a layer structure of an antireflection film;

FIG. 11 is a graph showing the spectral characteristic of an antireflection film;

FIG. 12 is a graph showing the spectral characteristic of an antireflection film according to a modification;

FIG. 13 is a graph showing the incident angle dependency of the spectral characteristic of the antireflection film according to the modification;

FIG. 14 is a graph showing the spectral characteristic of an antireflection film formed according to a prior art; and FIG. 15 is a graph showing the incident angle dependency of the spectral characteristic of the antireflection film formed according to the prior art.

DESCRIPTION OF THE EMBODIMENTS

Figure 1:
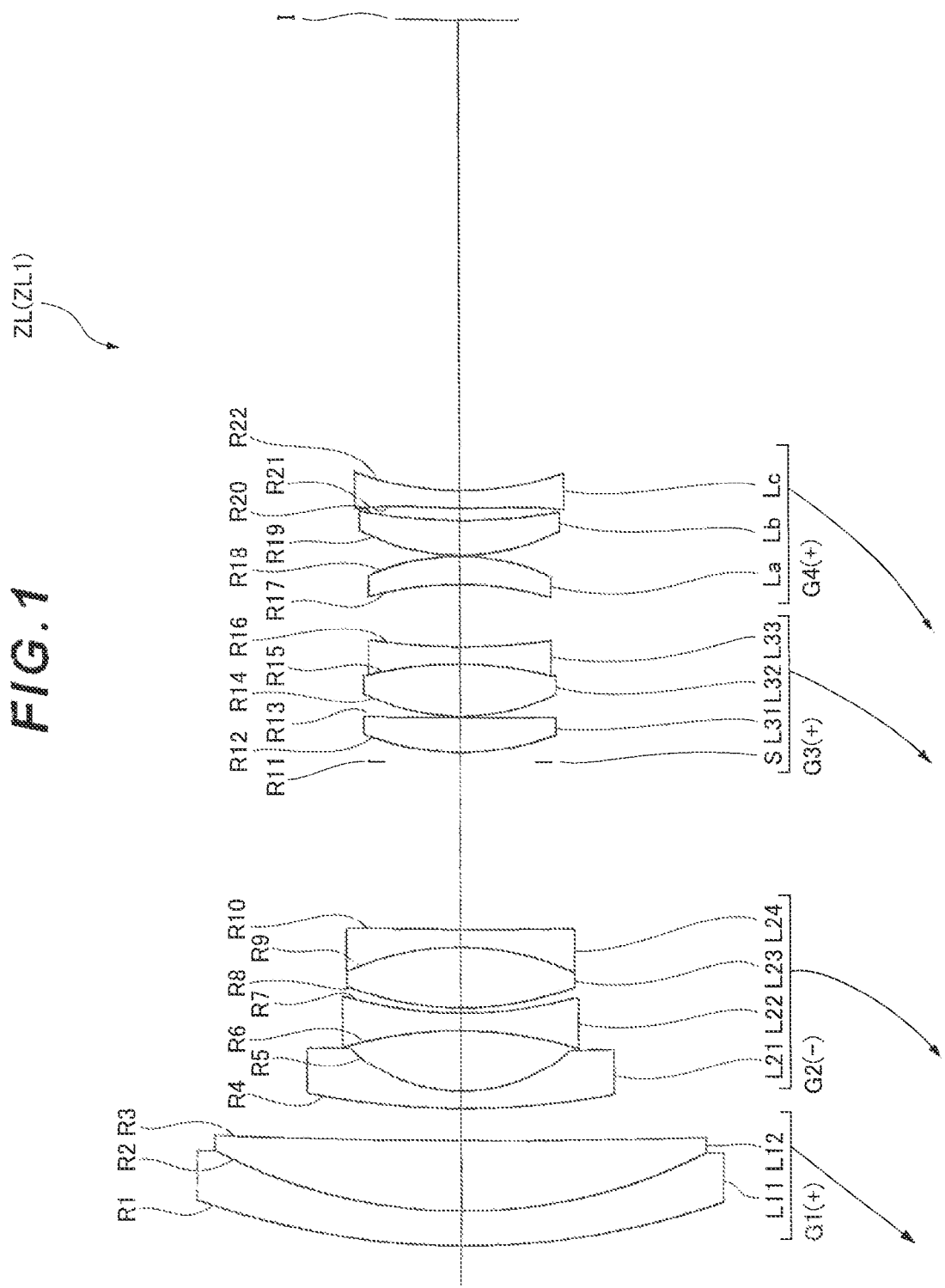

Embodiments of the present invention will now be described with reference to the drawings. As FIG. 1 shows, a zoom lens ZL according to the present embodiment includes, in order form an object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups, the fourth lens group G4 includes, in order from the object, a first positive lens component La, a second positive lens component Lb having a convex surface facing the object, and a negative lens component Lc, and the following conditional expression (1) is satisfied.

$$0.00 < (Rb2-Rb1)/(Rb2+Rb1) < 1.00 \tag{1}$$

where Rb2 denotes a radius of curvature of an image side surface of the second positive lens component Lb which constitutes the fourth lens group G4 and has the convex surface facing the object, and Rb1 denotes a radius of curvature of an object side surface of the second positive lens component Lb which constitutes the fourth lens group G4 and has the convex surface facing the object.

The present invention considers an effective means of miniaturizing a multigroup zoom lens having at least four lens groups (positive, negative, positive and positive). In particular, a focus of the present invention is the configuration of the fourth lens group G4. The fourth lens group G4 has a simple configuration of positive, positive and negative lens components, and succeeded in decreasing the back focus and the total length of the zoom lens without overly shortening the exit pupil. By this configuration, higher performance can also be implemented. Furthermore, the present invention becomes even more effective by optimizing the form for aberration correction, and setting optimum values for a focal length.

The conditional expression (1) is a reciprocal number of a form factor (q factor) of the second positive lens component Lb having a convex surface facing the object in the fourth lens group G4. If the upper limit value 1.00 of the conditional expression (1) is exceeded, the form of the lens changes from a plano-convex form, of which convex surface faces the object, and becomes a biconvex form. In other words, if 1.00 is exceeded, the form of the lens greatly changes. If the lower limit value of the conditional expression (1) is less than 0.00, that is a negative value, then the form of the lens completely changes to a convex surface facing the image. In this way, the conditional expression (1) is a condition to determine a form of the second positive lens component Lb having the convex surface facing the object in the fourth lens group G4.

If the upper limit value of the conditional expression (1) is exceeded, the form of the second positive lens component Lb having the convex surface facing the object deviates from an optimum meniscus form, and changes from the plano-convex form having the convex surface facing the object to a biconvex form, as mentioned above. Therefore the refractive power of the second positive lens component Lb having the convex surface facing the object increases, which results in an increase in the refractive power of the negative lens component Lc, and the generation of high order aberrations, and the deterioration of coma aberration and curvature of field, which is not desirable. Furthermore, the degree of sensitivity during assembly increases, which makes manufacturing more difficult.

If the upper limit value of the conditional expression (1) is 0.90, coma aberration and curvature of field can be correct well. If the upper limit value of the conditional expression (1) is 0.88, coma aberration and curvature of field can be corrected well. If the upper limit value of the conditional expression (1) is 0.80, coma aberration and curvature of field can be corrected well.

If the upper limit value of the conditional expression (1) is 0.70, coma aberration and curvature of field can be corrected even better. If the upper limit value of the conditional expression (1) is 0.65, coma aberration and curvature of field can be corrected even better. If the upper limit value of the conditional expression (1) is 0.60, coma aberration and curvature of field can be corrected even better, and the effect of this embodiment can be demonstrated to the maximum.

If the lower limit value of the conditional expression (1) is not reached, the form of the second positive lens component Lb having the convex surface facing the object deviates from an optimum meniscus form, and changes to a meniscus form having a convex surface facing the image, as mentioned above. This also makes it difficult to correct aberration appropriately. Particularly spherical aberration, curvature of field and astigmatism deteriorate, which is not desirable.

If the lower limit value of the conditional expression (1) is 0.05, various aberrations can be corrected well. If the lower limit value of the conditional expression (1) is 0.10, various aberrations can be corrected well. If the lower limit value of the conditional expression (1) is 0.15, various aberrations can be corrected well.

If the lower limit value of the conditional expression (1) is 0.19, various aberrations can be corrected even better. If the lower limit value of the conditional expression (1) is 0.20, various aberrations can be corrected even better. If the lower limit value of the conditional expression (1) is 0.25, various aberrations can be corrected even better, and the effect of this embodiment can be demonstrated to the maximum.

In the zoom lens ZL according to this embodiment, an antireflection film is formed on at least one surface out of the optical surfaces of the first lens group G1 and the second lens group G2 (in FIG. 1, this(these) surface(s) corresponds to the image side lens surface (surface number 3) of the positive meniscus lens L12 of the first lens group G1 and the object side lens surface (surface number 4) of the negative meniscus lens L21 of the second lens group G2), and this antireflection film includes at least one layer that is formed by a wet process. By this configuration, the zoom lens ZL according to this embodiment can decrease ghosts and flares which are generated by the light from the object being reflected by an optical surface, and can implement high image quality.

In the zoom lens ZL according to this embodiment, it is preferable that the antireflection film is a multilayer film, and the layer formed by the wet process is a layer closest to the surface out of the layers constituting the multilayer film. By this configuration, a difference of refractive indexes between the layer formed by the wet process and the air can be decreased, and the reflection of light can be further decreased, whereby ghosts and flares can be further decreased.

In the zoom lens ZL according to this embodiment, it is preferable that a refractive index nd, which is a refractive index of the layer formed by the wet process at d-line (wavelength: 587.6 nm), is 1.30 or less. By this configuration, a difference of refractive indexes between the layer formed by the wet process and the air can be decreased, and the reflection of light can be further decreased, whereby ghosts and flares can be further decreased.

In the zoom lens ZL according to this embodiment, it is preferable that the optical surface on which the antireflection film is formed is at least one surface out of the optical surfaces of the first lens group G1 and the second lens group G2, and the optical surface is a concave surface when viewed from an aperture stop S (of the third lens group G3). Ghosts tend to be generated on a lens surface that is concave when viewed from the aperture stop S, therefore ghosts and flares can be effectively decreased by forming the antireflection film on such a surface.

In the zoom lens ZL according to this embodiment, it is preferable that the lens surface on which the antireflection film is formed and which is concave when viewed from the aperture stop S is an image side lens surface of at least one lens included in the first lens group G1 and the second lens group G2. Ghosts tend to be generated on a lens surface that is concave when viewed from the aperture stop S, therefore ghosts and flares can be effectively decreased by forming the antireflection film on such a surface.

In the zoom lens ZL according to this embodiment, it is preferable that the lens surface on which the antireflection film is formed and which is concave when viewed from the aperture stop S is an object side lens surface of at least one lens included in the first lens group G1 and the second lens group G2. Ghosts tend to be generated on a lens surface that is concave when viewed from the aperture stop S, therefore ghosts and flares can be effectively decreased by forming the antireflection film on such a surface.

In the zoom lens ZL according to this embodiment, it is preferable that the optical surface on which the antireflection film is formed is at least one surface out of the optical surfaces of the first lens group G1 and the second lens group G2, and the optical surface is a concave surface when viewed from the object. Ghosts tend to be generated on a lens surface that is concave when viewed from the object, therefore ghosts and flares can be effectively decreased by forming the antireflection film on such a surface.

In the zoom lens ZL according to this embodiment, it is preferable that the lens surface on which the antireflection film is formed and which is concave when viewed from the object is an image side lens surface of a lens located in the second place from the object in the first lens group G1. Ghosts tend to be generated on a lens surface that is concave when viewed from the object, therefore ghosts and flares can be effectively decreased by forming the antireflection film on such a surface.

In the zoom lens ZL according to this embodiment, it is preferable that the lens surface on which the antireflection film is formed and which is concave when viewed from the object is an object side lens surface of a lens located in the second place from the object in the second lens group G2. Ghosts tend to be generated on a lens surface that is concave when viewed from the object, therefore ghosts and flares can be effectively decreased by forming the antireflection film on such a surface.

In the zoom lens ZL according to this embodiment, it is preferable that the lens surface on which the antireflection film is formed and which is concave when viewed from the object is an image side lens surface of a lens located in the third place from the object in the second lens group G2. Ghosts tend to be generated on a lens surface that is concave when viewed from the object, therefore ghosts and flares can be effectively decreased by forming the antireflection film on such a surface.

In the zoom lens ZL according to this embodiment, it is preferable that the lens surface on which the antireflection film is formed and which is concave when viewed from the object is an object side lens surface of a lens located in the fourth place from the object in the second lens group G2. Ghosts tend to be generated on a lens surface that is concave when viewed from the object, therefore ghosts and flares can be effectively decreased by forming the antireflection film on such a surface.

In the zoom lens ZL according to this embodiment, the antireflection film may be formed by a dry process rather than a wet process. In this case, it is preferable that the antireflection film includes at least one layer of which refractive index is 1.30 or less. If the antireflection film formed by a dry process includes at least one layer of which refractive index is 1.30 or less, the same effect as forming the antireflection film by a wet process can be acquired. In this case, it is preferable that the layer of which refractive index is 1.30 or less is a layer closest to the surface out of the layers constituting the multilayer film.

In the zoom lens ZL according to this embodiment, it is preferable that the following conditional expression (2) is satisfied, where Fc denotes a focal length of the negative lens component Lc constituting the fourth lens group G4, and F4 denotes a focal length of the fourth lens group.

$$0.45 < (-Fc)/F4 < 3.00 \qquad (2)$$

The conditional expression (2) specifies the focal length (absolute value) of the negative lens component Lc in the fourth lens group G4, in other words, the conditional expression (2) specifies the refractive power of the negative lens component Lc.

If the upper limit value of the conditional expression (2) is exceeded, the focal length (absolute value) of the negative lens component Lc becomes long with respect to the focal length of the fourth lens group G4. This means that the negative refractive power of the negative lens component Lc becomes weak. This is disadvantageous for minaturization, and increases the rear lens diameter. If miniaturization is forced, curvature of field deteriorates, and variations of coma aberration by zooming increase, which is not desirable.

If the upper limit value of the conditional expression (2) is 2.50, various aberrations can be corrected well. If the upper limit value of the conditional expression (2) is 2.20, various aberrations can be corrected well.

If the upper limit value of the conditional expression (2) is 2.00, various aberrations can be corrected even better. If the upper limit value of the conditional expression (2) is 1.90, various aberrations can be corrected even better, and the effect of this embodiment can be demonstrated to the maximum.

If the lower limit value of the conditional expression (2) is not reached, the focal length (absolute value) of the negative lens component Lc becomes short with respect to the focal length of the fourth lens group G4. This means that the negative refractive power of the negative lens component lc becomes strong. This increases displacement by the angle of view and variation by zooming in the spherical aberration, curvature of field and upward coma aberration, which is not desirable.

If the lower limit value of the conditional expression (2) is 0.50, various aberrations can be corrected well. If the lower limit value of the conditional expression (2) is 0.74, various aberrations can be corrected well.

If the lower limit value of the conditional expression (2) is 0.80, various aberrations can be corrected even better. If the lower limit value of the conditional expression (2) is 0.90, various aberrations can be corrected even better, and the effect of this embodiment can be demonstrated to the maximum.

In the zoom lens ZL according to this embodiment, it is preferable that the following conditional expression (3) is satisfied, where Fab denotes a combined focal length of the first positive lens component La and the second positive lens component Lb having a convex surface facing the object, which constitute the fourth lens group G4, and F4 denotes a focal length of the fourth lens group G4.

$$0.10 < Fab/F4 < 2.00 \qquad (3)$$

The conditional expression (3) specifies the combined focal length of the positive lens component La and the second positive lens component Lb having the convex surface facing the object in the fourth lens group G4. In other words, the conditional expression (3) specifies the combined refractive power.

If the upper limit value of the conditional expression (3) is exceeded, the combined focal length of the first positive lens component La and the second positive lens component Lb having the convex surface facing the object becomes long with respect to the focal length of the fourth lens group G4. This means that the combined refractive power becomes weak. This deteriorates spherical aberration correction, and is a disadvantage for miniaturization, resulting in a large zoom lens, which is not desirable.

If the upper limit value of the conditional expression (3) is 1.80, various aberrations, including spherical aberration, can be corrected well. If the upper limit value of the conditional expression (3) is 1.50, various aberrations, including spherical aberration, can be corrected well.

If the upper limit value of the conditional expression (3) is 1.00, various aberrations, including spherical aberration, can be corrected even better. If the upper limit value of the conditional expression (3) is 0.80, various aberrations, including spherical aberration, can be corrected even better. If the upper limit value of the conditional expression (3) is 0.70, various aberrations, including spherical aberration, can be corrected even better, and the effect of this embodiment can be demonstrated to the maximum.

If the lower limit value of the conditional expression (3) is not reached, the combined focal length of the first positive lens component La and the second positive lens component Lb having the convex surface facing the object becomes short with respect to the focal length of the fourth lens group G4. This means that the combined refractive power becomes strong. This results in an increase in displacement due to the angle of view and variation by zooming in the spherical direction and upward coma aberrations in the telephoto end side, and an increase in a change of curvature of field, which is not desirable.

If the lower limit value of the conditional expression (3) is 0.20, various aberrations, including coma aberration, can be corrected well. If the lower limit value of the conditional expression (3) is 0.30, various aberrations, including coma aberration, can be corrected well.

If the lower limit value of the conditional expression (3) is 0.40, various aberrations, including coma aberration, can be corrected even better. If the lower limit value of the conditional expression (3) is 0.45, various aberrations, including coma aberration, can be corrected even better. If the lower limit value of the conditional expression (3) is 0.50, various aberrations, including coma aberration, can be corrected even better, and the effect of this embodiment can be demonstrated to the maximum.

In the zoom lens ZL according to this embodiment, it is preferable that the following conditional expression (4) is satisfied, where F2 denotes a focal length of the second lens group G2, and Fw denotes a focal length of the zoom lens upon focusing on infinity in the wide-angle end state.

$$0.30 < (-F2)/Fw < 2.00 \qquad (4)$$

The conditional expression (4) specifies the focal length of the second lens group G2, in other words, the conditional expression (4) specifies the refractive power thereof.

If the upper limit value of the conditional expression (4) is exceeded, the focal length of the second lens group G2 becomes long. This means that the refractive power of the second lens group G2 becomes weak. This is disadvantageous for miniaturization since the total length of the zoom lens increases. If the zoom ratio required for aberration correction is secured, then variation of the lateral chromatic aberration and curvature of field by zooming increases, which is not desirable.

If the upper limit value of the conditional expression (4) is 1.80, various aberrations can be corrected well. If the upper limit value of the conditional expression (4) is 1.50, various aberrations can be corrected well.

If the upper limit value of the conditional expression (4) is 1.00, various aberrations can be corrected even better. If the upper limit value of the conditional expression (4) is 0.80, various aberrations can be corrected even better. If the upper limit value of the conditional expression (4) is 0.70, various aberrations can be corrected even better, and the effect of this embodiment can be demonstrated to the maximum.

If the lower limit value of the conditional expression (4) is not reached, the focal length of the second lens group G2 becomes short. This means that the refractive power of the second lens group G2 becomes strong. This particularly deteriorates variation of the spherical chromatic aberration and coma aberration by zooming in the telephoto end side, which is not desirable.

If the lower limit value of the conditional expression (4) is 0.40, various aberrations can be corrected well. If the lower limit value of the conditional expression (4) is 0.50, various aberrations can be corrected well.

If the lower limit value of the conditional expression (4) is 0.52, various aberrations can be corrected even better. If the lower limit value of the conditional expression (4) is 0.58, various aberrations can be corrected even better, and the effect of this embodiment can be demonstrated to the maximum.

In the zoom lens ZL according to this embodiment, it is preferable that the following conditional expression (5) is satisfied, where vdc denotes an Abbe number of the negative lens component Lc constituting the fourth lens group at d-line (wavelength: 587.6 nm a).

$$45 < vdc < 85 \quad (5)$$

The conditional expression (5) specifies the Abbe number of the negative lens component Lc in the fourth lens group G4.

If the upper limit value of the conditional expression (5) is exceeded, dispersion of the Abbe number of the negative lens component Lc becomes low, and correction of lateral chromatic aberration deteriorates, which is not desirable.

If the upper limit value of the conditional expression (5) is 75, chromatic aberration can be corrected well. If the upper limit value of the conditional expression (5) is 73, chromatic aberration can be corrected well.

If the upper limit value of the conditional expression (5) is 70, chromatic aberration can be corrected even better. If the upper limit value of the conditional expression (5) is 68, chromatic aberration can be corrected even better, and the effect of this embodiment can be demonstrated to the maximum.

If the lower limit value of the conditional expression (5) is not reached, dispersion of the Abbe number of the negative lens component Lc becomes high, and lateral chromatic aberration, particularly secondary dispersion of lateral chromatic aberration, deteriorates, which is not desirable.

If the lower limit value of the conditional expression (5) is 50, chromatic aberration can be corrected well. If the lower limit value of the conditional expression (5) is 52, chromatic aberration can be corrected well.

If the lower limit value of the conditional expression (5) is 54, chromatic aberration can be corrected even better. If the lower limit value of the conditional expression (5) is 58, chromatic aberration can be corrected even better, and the effect of this embodiment can be demonstrated to the maximum.

In the zoom lens ZL according to this embodiment, it is preferable that the following conditional expression (6) is satisfied, where Bfw denotes a back focus of the zoom lens upon focusing on infinity in the wide-angle end state, and Fw denotes a focal length of the zoom lens upon focusing on infinity in the wide-angle end state.

$$0.5 < Bfw/Fw < 2.0 \quad (6)$$

The conditional expression (6) specifies the back focus in the wide-angle end state.

If the upper limit value of the conditional expression (6) is exceeded, the back focus becomes very long, which runs against miniaturization and is not desirable. Furthermore, if this structure is used, each lens group must have low refractive power in order to correct aberrations, hence variations of curvature of field tend to be generated, which is not desirable.

If the upper limit value of the conditional expression (6) is 1.8, various aberrations can be corrected well. If the upper limit value of the conditional expression (6) is 1.7, various aberrations can be corrected well.

If the upper limit value of the conditional expression (6) is 1.6, various aberrations can be corrected even better. If the upper limit value of the conditional expression (6) is 1.5, various aberrations can be corrected even better, and the effect of this embodiment can be demonstrated to the maximum.

If the lower limit value of the conditional expression (6) is not reached, the back focus becomes very short, and the distance to the exit pupil also becomes short, which is not desirable for an optical system used for a digital camera or the like. Furthermore, if this structure is used, each lens group must have high refractive power in order to correct aberrations, hence variations of coma aberration and curvature of field tend to be generated, which is not desirable.

If the lower limit value of the conditional expression (6) is 0.6, various aberrations can be corrected well. If the lower limit value of the conditional expression (6) is 0.8, various aberrations can be corrected well.

If the lower limit value of the conditional expression (6) is 1.0, various aberrations can be corrected even better. If the lower limit value of the conditional expression (6) is 1.4, various aberrations can be corrected even better, and the effect of this embodiment can be demonstrated to the maximum.

In the zoom lens ZL according to this embodiment, it is preferable that the fourth lens group G4 has at least one aspherical surface. By this configuration, coma aberration and distortion can be corrected well.

In the zoom lens ZL according to this embodiment, it is even more preferable that the negative lens component Lc constituting the fourth lens group G4 has at least one aspherical surface. By this configuration, coma aberration and distortion can be corrected well.

In the zoom lens ZL according to this embodiment, it is preferable that focusing of the zoom lens on a short distance object is performed by moving, on the optical axis, the second lens group G2 having negative refractive power. By this configuration, variation of short distance aberrations, particularly variation of curvature of field and coma aberration can be decreased, which is preferable.

FIG. 8 is a cross-sectional view of a mirrorless camera 1 with interchangeable lenses (hereafter called "camera"), which is an example of an imaging device having the above mentioned zoom lens ZL. In this camera 1, light from an object (not illustrated) is collected by a camera lens 2 (zoom lens ZL according to this embodiment), and forms an object image on an imaging surface of an imaging unit 3 via an OLPF (optical low pass filter), which is not illustrated. The object image is photoelectric-converted by a photoelectric conversion element disposed in the imaging unit 3, whereby an image of the object is generated. This image is displayed on an EVF (electronic view finder) 4 disposed on the camera 1. Thereby the user can observe the object image via the EVF 4.

If the user presses a release button (not illustrated), the image, which was photoelectric-converted by the imaging unit 3, is stored in a memory (not illustrated). In this way, the user can photograph the object using this camera 1.

The camera 1 may removably hold the camera lens 2 (zoom lens ZL) or may integrate the camera lens 2 (zoom lens ZL) therein.

Here the mirrorless camera is used as an example of the imaging device having the camera lens 2 (zoom lens ZL), but the present invention is not limited to the mirrorless camera, but may be a single-lens reflex camera where the camera main unit has a quick return mirror, and an object image is observed via a finder optical system.

The zoom lens ZL according to this embodiment, which is mounted as the camera lens 2 of this camera 1, is a super wide-angle lens which includes a wide-angle of view, with little spherical aberration, curvature of field, astigmatism and coma aberration because of the distinctive lens configuration, as shown in each example to be described later. Therefore this camera 1 can implement a wide-angle imaging device having a wide-angle of view with little spherical aberration, curvature of field, astigmatism and coma aberration.

A method for manufacturing the zoom lens ZL having the above mentioned configuration will now be described with reference to FIG. 9. First the first lens group G1 to the fourth lens group G4 are assembled in a lens barrel (step S10). In this assemble step, each lens is arranged so that the first lens group G1 has positive refractive power, the second lens group G2 has negative refractive power, the third lens group G3 has positive refractive power, and the fourth lens group G4 has positive refractive power. The fourth lens group G4 is configured such that the first positive lens component La, the second positive lens component Lb having a convex surface facing the object and the negative lens component Lc are arranged in order from the object (step S20).

An example of the lens arrangement according to this embodiment is: a cemented positive lens, in which a negative meniscus lens L11 having a convex surface facing the object and a positive meniscus lens L12 are cemented in order from the object, is arranged as the first lens group G1; a negative meniscus aspherical lens L21 which has a convex surface facing the object and an aspherical surface facing the image, a biconcave lens L22, and a cemented positive lens in which a biconvex lens L23 and a biconcave lens L24 are cemented, are arranged in order from the object as the second lens group G2; an aperture stop S, a positive meniscus lens L31 having a concave surface facing the object, and a cemented positive lens in which a biconvex lens L32 and a biconcave lens L33 are cemented, are arranged in order from the object as the third lens group G3; and a positive meniscus lens (corresponding to the first positive lens component in the Claims) La having a concave surface facing the object, a positive meniscus lens (corresponding to the second positive lens component of the Claims) Lb having a convex surface facing the object, and a negative lens (corresponding to the negative lens component in the Claims) Lc having an aspherical surface facing the object are arranged in order from the object as the fourth lens group G4 (see FIG. 1).

Then each lens is arranged so that the air gap between the lens groups changes upon zooming from the wide-angle end state to the telephoto end state (in other words, the gap between the first lens group G1 and the second lens group G2 changes, the gap between the second lens group G2 and the third lens group G3 changes, and the gap between the third lens group G3 and the fourth lens group G4 changes) (step S30).

Then each lens is arranged so that the following conditional expression (1) is satisfied, where Rb2 denotes a radius of curvature of the image side surface of the second positive lens component Lb which constitutes the fourth lens group G4 and has a convex surface facing the object, and Rb1 denotes a radius of curvature of the object side surface of the second positive lens component Lb which constitutes the fourth lens group G4 and has the convex surface facing the object (step S40).

$$0.00 < (Rb2-Rb1)/(Rb2+Rb1) < 1.00 \quad (1)$$

If the manufacturing method according to this embodiment is used, a zoom lens ZL which is miniaturized, constituting a small number of lenses, having high performance and little aberrations, can be implemented.

EXAMPLES

Each example of this embodiment will now be described with reference to the drawings. The following Table 1 to Table 3 are tables of various data of Example 1 to Example 3 respectively.

In [Surface data] in each table, a surface number indicates a sequence of the lens surface from the object side along the light traveling direction, R denotes a radius of curvature of each lens surface, D denotes a distance from each optical surface to the next optical surface (or image plane) on the optical axis, nd denotes a refractive index with respect to d-line (wavelength: 587.6 nm), vd denotes an Abbe number of the lens material at d-line, (variable) indicates a variable surface distance, and (stop S) indicates an aperture stop S. "∞" in the column of radius of curvature R indicates a plane. The refractive index of air (d-line) 1.000000 is omitted.

In [Aspherical data] a form of the aspherical surface shown in [Surface data] is given by the following expression (a), where y denotes a height in a direction perpendicular to the optical axis, X(y) denotes a displacement (sag) in the optical axis direction at the height y, r denotes a radius of curvature (paraxial radius of curvature) of the reference spherical surface, K denotes a conical coefficient, and An denotes an aspherical coefficient in degree n. "E-n" indicates "×10$^{-n}$", and "1.234E-05", for example, indicates "1.234×10$^{-5}$".

$$X(y) = (y^2/r)/[1+\{1-\kappa(y^2/r^2)\}^{1/2}] + A4 \times y^4 + A6 \times y^6 + A8 \times y + A10 \times y^{10} \quad (a)$$

In [Various data] in each table, f denotes a focal length, FNO denotes an F number, ω denotes a half angle of view (unit: degree), Y denotes an image height, TL denotes a total lens length, Σd denotes a distance, on the optical axis, from the lens surface closest to the object to the lens surface closest to the image in the zoom lens ZL, and BF denotes back focus.

In [Lens group distance data], Di (i is an integer) in each state of the wide-angle end state, intermediate focal length state and telephoto end state at infinity, the intermediate focal point and the short distance object point indicates a variable distance between the i-th surface and the (i+1)-th surface.

In [Zoom lens group data] in each table, G denotes a group number, "First surface of group" indicates a surface number of a surface closest to the object in each group, and "Group focal length" indicates a focal length of each group.

In [Conditional expression] in each table, a correspondence value of each conditional expression (1) to (6) is shown.

In all the data values, "mm" is normally used as the unit of focal length f, radius of curvature R, surface distance D and other lengths, but unit is not limited to "mm", since an equivalent optical performance is obtained even if an optical system is proportionally expanded or proportionally reduced. Unit is not limited to "mm" but another appropriate unit can be used.

The description on the table is the same for other examples, and is therefore omitted hereinbelow.

Example 1

Example 1 will be described with reference to FIG. 1 to FIG. 3 and Table 1. FIG. 1 shows a configuration of a zoom lens ZL (ZL1) according to Example 1 and a zoom track from the wide-angle end state (W) to a telephoto end state (T). As FIG. 1 shows, the zoom lens ZL1 according to Example 1 includes, in order from the object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups.

The first lens group G1 is configured of a cemented positive lens in which a negative meniscus lens L11 having a convex surface facing the object and a positive meniscus lens L12 are cemented in order from the object.

The second lens group G2 is configured of, in order from the object, a negative meniscus aspherical lens L21 having a convex surface facing the object and an aspherical surface facing the image, a biconcave lens L22, and a cemented positive lens in which a biconvex lens L23 and a biconcave lens L24 are cemented.

The third lens group G3 is configured of, in order from the object, an aperture stop S, a positive meniscus lens L31 having a convex surface facing the object, and a cemented positive lens in which a biconvex lens L32 and a biconcave lens L33 are cemented.

The fourth lens group G4 is configured of, in order from the object, a positive meniscus lens (corresponding to the first positive lens component in the Claims) La having a concave surface facing the object, a positive meniscus lens (corresponding to the second positive lens component in the Claims) Lb having a convex surface facing the object, and a negative lens (corresponding to the negative lens component in the Claims) Lc having an aspherical surface facing the object.

In Example 1, a later mentioned antireflection film is formed on the image side lens surface of the positive meniscus lens L12 of the first lens group G1, and the object side lens surface of the negative meniscus lens L21 of the second lens group G2.

Table 1 shows data of Example 1. The surface numbers 1 to 22 in Table 1 correspond to the lens surfaces of which radius of curvature R1 to R22 are shown in FIG. 1 respectively. In Example 1, Surface 5 and Surface 21 are formed to be aspherical.

TABLE 1

[Surface data]

| Surface number | R | D | nd | vd |
|---|---|---|---|---|
| Object surface | ∞ | | | |
| 1 | 44.9802 | 2.0000 | 1.846660 | 23.78 |
| 2 | 30.6800 | 4.0000 | 1.755000 | 52.29 |
| 3 | 335.7161 | D3(variable) | | |
| 4 | 46.5048 | 1.0000 | 1.816000 | 46.63 |
| *5 | 9.6609 | 3.5000 | | |
| 6 | −23.7772 | 1.0000 | 1.816000 | 46.63 |
| 7 | 23.5386 | 0.3000 | | |
| 8 | 17.5556 | 3.5000 | 1.850260 | 32.35 |
| 9 | −15.6449 | 1.0000 | 1.755000 | 52.29 |
| 10 | 228.0043 | D10(variable) | | |
| 11 | (Stop S) | 0.5280 | | |
| 12 | 15.3232 | 2.0000 | 1.516800 | 64.12 |
| 13 | 1154.3277 | 0.0660 | | |
| 14 | 12.4462 | 3.0000 | 1.497820 | 82.56 |
| 15 | −21.9705 | 1.0000 | 1.850260 | 32.35 |
| 16 | 39.0608 | D16(variable) | | |
| 17 | −18.6716 | 1.6000 | 1.518230 | 58.89 |
| 18 | −12.8073 | 0.1000 | | |
| 19 | 12.4847 | 2.0000 | 1.516800 | 64.12 |
| 20 | 34.3216 | 0.7000 | | |
| *21 | 60.0000 | 1.0000 | 1.516800 | 64.12 |
| 22 | 17.7163 | BF | | |
| Image plane | ∞ | | | |

[Aspherical data]

Surface 5

κ = 0.5803, A4 = 6.81360E−05, A6 = 2.12992E−06,
A8 = −3.60026E−08, A10 = 8.02177E−10

Surface 21

κ = −0.1939E+03, A4 = −1.53238E−04, A6 = −3.21406E−06,
A8 = 8.44333E−09, A10 = 2.91566E−10

| | Wide-angle end | Intermediate focal length | Telephoto end |
|---|---|---|---|
| [Various data] Zoom ratio 2.88649 | | | |
| f = | 18.5~ | 35.0~ | 53.4 |
| FNO = | 4.11~ | 5.31~ | 5.88 |
| ω = | 39.18~ | 21.77~ | 14.48 |
| Y = | 14.25~ | 14.25~ | 14.25 |
| TL = | 70.49~ | 83.12~ | 96.38 |
| Σd = | 43.38~ | 43.57~ | 48.55 |
| BF = | 27.12~ | 39.56~ | 47.83 |
| [Lens group distance data] Infinity | | | |
| F | 18.50000 | 35.00000 | 53.40000 |
| D0 | 0.0000 | 0.0000 | 0.0000 |
| D3 | 1.86981 | 9.44802 | 17.40524 |
| D10 | 9.61764 | 3.41218 | 0.90752 |
| D16 | 3.59458 | 2.41127 | 1.94774 |
| BF | 27.11574 | 39.55664 | 47.82965 |
| Intermediate focal point | | | |
| β | −0.02500 | −0.02500 | −0.02500 |
| D0 | 710.9542 | 1351.7958 | 2057.7118 |
| D3 | 1.50616 | 9.18238 | 17.14278 |
| D10 | 9.98129 | 3.67783 | 1.16997 |
| D16 | 3.59458 | 2.41127 | 1.94774 |
| BF | 27.11574 | 39.55664 | 47.82965 |
| Short distance | | | |
| β | −0.06015 | −0.11196 | −0.16377 |
| D0 | 279.5082 | 266.8779 | 253.6159 |
| D3 | 1.00333 | 8.28255 | 15.75211 |
| D10 | 10.48412 | 4.57766 | 2.56065 |
| D16 | 3.59458 | 2.41127 | 1.94774 |
| BF | 27.11574 | 39.55664 | 47.82965 |

[Zoom lens group data]

| Group number | First surface of group | Group focal length |
|---|---|---|
| G1 | 1 | 72.597 |
| G2 | 4 | −11.880 |
| G3 | 12 | 24.107 |
| G4 | 17 | 41.578 |

[Conditional Expressions]

| | |
|---|---|
| $(Rb2-Rb1)/(Rb2+Rb1)=0.467$ | Conditional expression (1) |
| $(-Fc)/F4=1.131$ | Conditional expression (2) |
| $Fab/F4=0.548$ | Conditional expression (3) |
| $(-F2)/Fw=0.643$ | Conditional expression (4) |
| $vdc=64.12$ | Conditional expression (5) |
| $Bfw/Fw=1.466$ | Conditional expression (6) |

As the data in Table 1 shows, the zoom lens ZL1 according to this example satisfies all the conditional expressions (1) to (6).

Figure 2C:
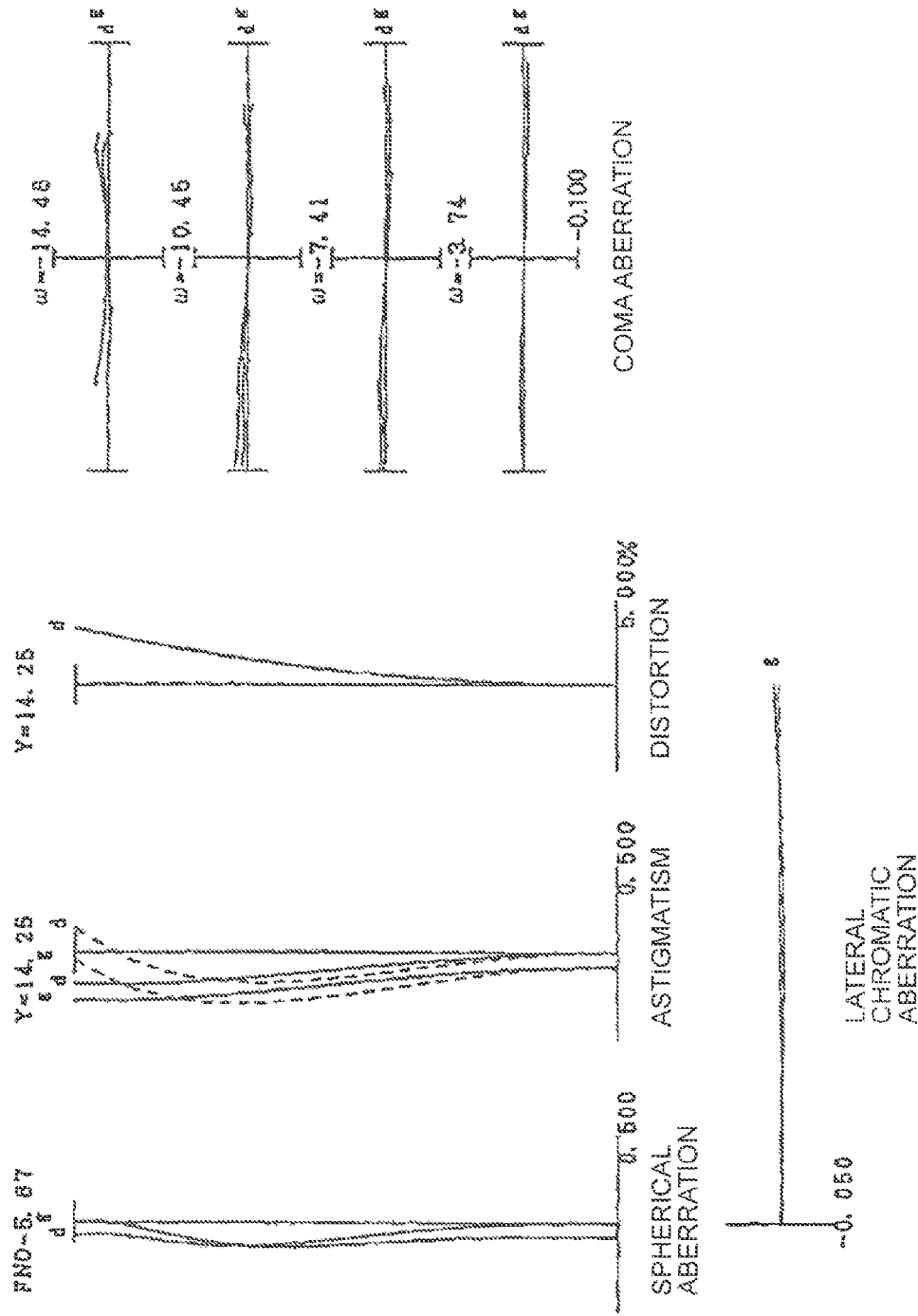

FIG. 2 are graphs showing various aberrations of the zoom lens ZL1 according to Example 1, where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.

In each graph showing aberrations, FNO denotes an F number, Y denotes an image height, ω denotes a half angle of view, d denotes d-line (wavelength: 587.6 nm), and g denotes g-line (wavelength: 435.8 nm). In graphs showing astigmatism, the solid line indicates the sagittal image plane, and the broken line indicates the meridional image plane. In the graph showing coma aberration, the solid line indicates meridional coma. The description on the graphs showing aberrations is the same for the other examples.

As each graph showing aberrations clarifies, in Example 1, various aberrations, including spherical aberration, curvature of field, astigmatism and coma aberration, are corrected well in each focal length state, from the wide-angle end state to the telephoto end state.

FIG. 3 shows a state of a ghost which is generated in the zoom lens ZL of Example 1 by the beam BM entered from the object side. In FIG. 3, if the beam BM enters the zoom lens ZL from the object side as illustrated, the light is reflected on the lens surface (first ghost generation surface, surface number 4) on the object side of the negative meniscus lens L21 (that is, the radius of curvature R4), the reflected light is reflected again on the lens surface (second ghost generation surface, surface number 3) on the image side of the positive meniscus lens L12 (that is, radius of curvature R3), and reaches the image plane I, and generates a ghost. The first ghost generation surface (surface number 4) is a lens surface which is concave when viewed from the aperture stop S, and the second ghost generation surface (surface number 3) is a lens surface which is concave when viewed from the aperture stop S. By forming an antireflection film corresponding to the wide incident angle in a wide wavelength range on such surfaces, ghosts can be effectively decreased.

Example 2

Figure 4:
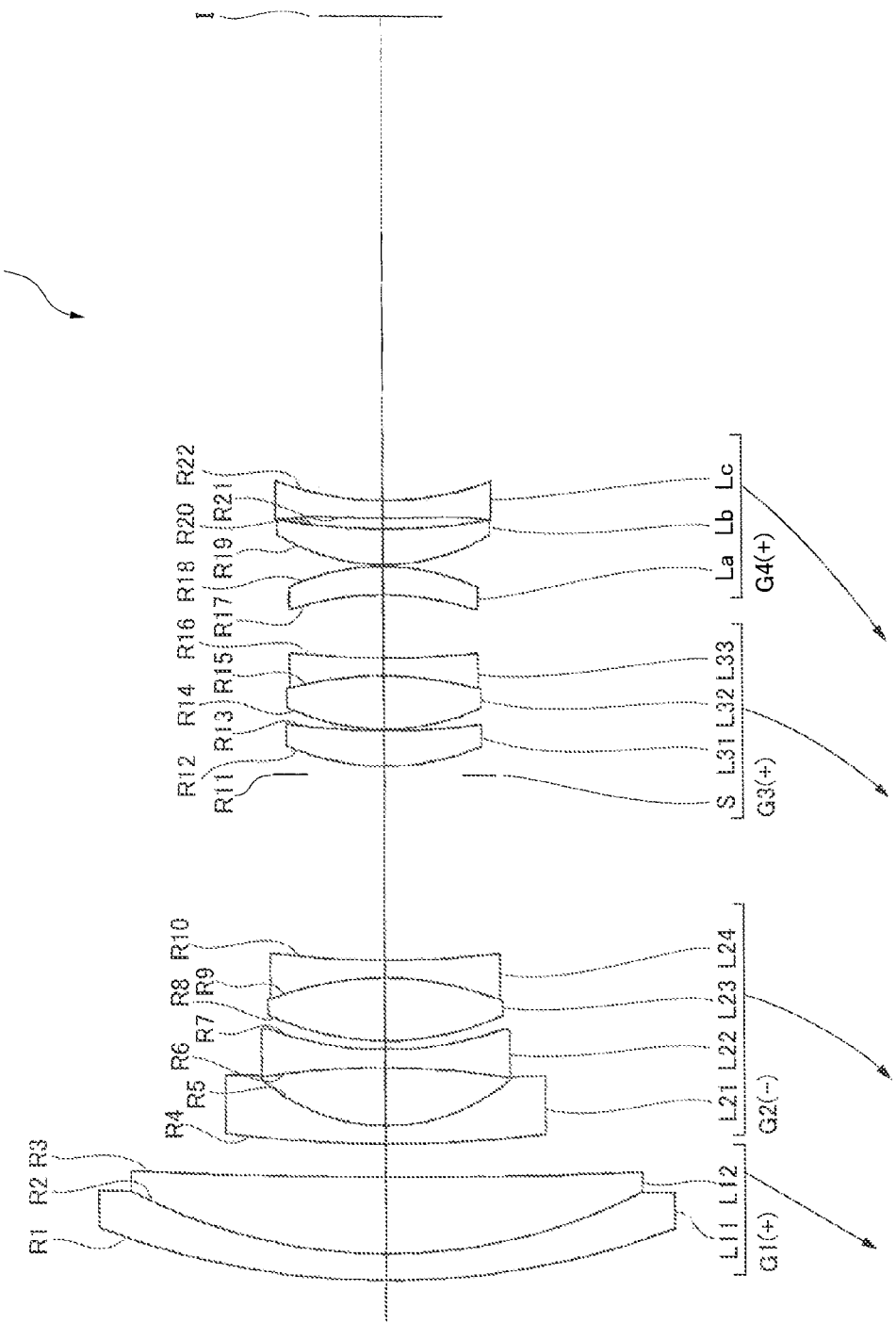
FIG. 4 shows a configuration of a zoom lens according to Example 2 and a zoom track from a wide-angle end state (W) to a telephoto end state (T)

Example 2 will be described with reference to FIG. 4, FIG. 5 and Table 2. FIG. 4 shows a configuration of a zoom lens ZL (ZL2) according to Example 2, and a zoom track from wide-angle end state (W) to a telephoto end state (T). As FIG. 4 shows, the zoom lens ZL2 according to Example 2 includes, in order from an object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups.

The first lens group G1 is configured of a cemented positive lens in which a negative meniscus lens L11 having a convex surface facing the object and a positive meniscus lens L12 are cemented in order from the object.

The second lens group G2 is configured of, in order from the object, a negative meniscus aspherical lens L21 having a convex surface facing the object and an aspherical surface facing the image, a biconcave lens L22, and a cemented positive lens in which a biconvex lens L23 and a biconcave lens L24 are cemented.

The third lens group G3 is configured of, in order from the object, an aperture stop S, a positive meniscus lens L31 having a convex surface facing the object, and a cemented positive lens in which a biconvex lens L32 and a biconcave lens L33 are cemented.

The fourth lens group G4 is configured of, in order from the object, a positive meniscus lens La (corresponding to the first positive lens component in the Claims) having a concave surface facing the object, a positive meniscus lens Lb (corresponding to the second positive lens component in the Claims) having a convex surface facing the object, and a negative lens Lc (corresponding to the negative lens component in the Claims) having an aspherical surface facing the object.

In Example 2, the later mentioned antireflection film is formed on the image side lens surface of the negative meniscus lens L21 of the second lens group G2, and the object side lens surface of the biconcave lens L22 of the second lens group G2.

Table 2 shows data of Example 2. The surface numbers 1 to 22 in Table 2 correspond to the optical surfaces of radius of curvatures R1 to R22 shown in FIG. 4 respectively. In Example 2, Surface 5 and Surface 21 are formed to be aspherical.

TABLE 2

[Surface data]

| Surface number | R | D | nd | vd |
|---|---|---|---|---|
| Object surface | ∞ | | | |
| 1 | 45.2359 | 1.5000 | 1.846660 | 23.78 |
| 2 | 30.6944 | 4.3000 | 1.755000 | 52.29 |
| 3 | 356.9766 | D3(variable) | | |
| 4 | 72.4189 | 1.0000 | 1.816000 | 46.63 |
| *5 | 10.5122 | 3.3000 | | |
| 6 | −43.1510 | 1.0000 | 1.816000 | 46.63 |
| 7 | 19.0384 | 0.5000 | | |
| 8 | 15.5655 | 3.5000 | 1.850260 | 32.35 |
| 9 | −17.5410 | 1.0000 | 1.755000 | 52.29 |
| 10 | 51.2872 | D10(variable) | | |
| 11 | (Stop S) | 0.5280 | | |
| 12 | 13.6167 | 2.0000 | 1.618000 | 63.38 |
| 13 | 43.7716 | 0.0660 | | |
| 14 | 12.6174 | 3.0000 | 1.497820 | 82.56 |
| 15 | −20.2019 | 1.0000 | 1.850260 | 32.35 |
| 16 | 47.9127 | D16(variable) | | |
| 17 | −16.8042 | 1.6000 | 1.516800 | 64.12 |
| 18 | −12.4769 | 0.1000 | | |
| 19 | 11.3233 | 2.0000 | 1.516800 | 64.12 |
| 20 | 34.3216 | 0.6000 | | |
| *21 | 60.0000 | 1.0000 | 1.589130 | 61.18 |
| 22 | 17.6665 | BF | | |
| Image plane | ∞ | | | |

TABLE 2-continued

[Aspherical data]

Surface 5

$\kappa = 0.5490$, A4 = 6.23785E−05, A6 = 8.93712E−07,
A8 = −3.43635E−09, A10 = 1.85114E−10

Surface 21

$\kappa = -0.1427E+03$, A4 = −1.88342E−04, A6 = −3.20208E−06,
A8 = 4.51585E−08, A10 = −4.69074E−10

|  | Wide-angle end | Intermediate focal length | Telephoto end |
| --- | --- | --- | --- |
| [Various data] Zoom ratio 2.88649 | | | |
| f = | 18.5~ | 35.0~ | 53.4 |
| FNO = | 4.14~ | 5.40~ | 5.91 |
| ω = | 39.11~ | 21.78~ | 14.49 |
| Y = | 14.25~ | 14.25~ | 14.25 |
| Σd = | 43.70~ | 44.02~ | 48.91 |
| BF = | 27.18~ | 39.59~ | 47.88 |
| [Lens group distance data] Infinity | | | |
| F | 18.50000 | 35.00000 | 53.40004 |
| D0 | 0.0000 | 0.0000 | 0.0000 |
| D3 | 1.86219 | 9.49618 | 17.40987 |
| D10 | 10.30074 | 4.10170 | 1.59094 |
| D16 | 3.54090 | 2.42404 | 1.91149 |
| BF | 27.18454 | 39.58976 | 47.88886 |
| Intermediate focal point | | | |
| β | −0.02500 | −0.02500 | −0.02500 |
| D0 | 710.8471 | 1351.5236 | 2057.5486 |
| D3 | 1.49854 | 9.22985 | 17.14723 |
| D10 | 10.66439 | 4.36803 | 1.85358 |
| D16 | 3.54090 | 2.42404 | 1.91149 |
| BF | 27.18454 | 39.58976 | 47.88886 |
| Short distance | | | |
| β | −0.06021 | −0.11204 | −0.16390 |
| D0 | 279.1176 | 266.3943 | 253.2048 |
| D3 | 0.99492 | 8.32697 | 15.75439 |
| D10 | 11.16801 | 5.27090 | 3.24642 |
| D16 | 3.54090 | 2.42404 | 1.91149 |
| BF | 27.18454 | 39.58976 | 47.88886 |

[Zoom lens group data]

| Group number | First surface of group | Group focal length |
| --- | --- | --- |
| G1 | 1 | 72.597 |
| G2 | 4 | −11.880 |
| G3 | 12 | 24.107 |
| G4 | 17 | 41.578 |

[Conditional Expressions]

| | |
| --- | --- |
| $(Rb2-Rb1)/(Rb2+Rb1)=0.504$ | Conditional expression (1) |
| $(-Fc)/F4=1.131$ | Conditional expression (2) |
| $Fab/F4=0.538$ | Conditional expression (3) |
| $(-F2)/Fw=0.642$ | Conditional expression (4) |
| $vdc=61.18$ | Conditional expression (5) |
| $Bfw/Fw=1.469$ | Conditional expression (6) |

As the data in Table 2 shows, the zoom lens ZL2 according to this example satisfies all the conditional expressions (1) to (6).

FIG. 5 are graphs showing various aberrations of the zoom lens ZL2 according to Example 2, where FIG. 5A are graphs showing various aberrations of the zoom lens upon focusing on infinity in the wide-angle end state, FIG. 5B are graphs showing various aberrations of the zoom lens upon focusing on infinity in the intermediate focal length state, and FIG. 5C are graphs showing various aberrations of the zoom lens upon focusing on infinity in the telephoto end state. As each graph showing aberrations clarifies, in Example 2, various aberrations, including spherical aberration, curvature of field, astigmatism and coma aberration, are corrected well in each focal length state, from the wide-angle end state to the telephoto end state.

Example 3

Example 3 will be described with reference to FIG. 6, FIG. 7 and Table 3. FIG. 6 shows a configuration of a zoom lens ZL (ZL3) according to Example 3, and a zoom track from a wide-angle end state (W) to a telephoto end state (T). As FIG. 6 shows, the zoom lens ZL3 according to Example 3 includes, in order from an object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups.

The first lens group G1 is configured of a cemented positive lens in which a negative meniscus lens L11 having a convex surface facing the object and a positive lens L12 are connected in order from the object.

The second lens group G2 is configured of, in order from the object, a negative meniscus aspherical lens 121 having a convex surface facing the object and an aspherical surface facing the image, a biconcave lens L22, a biconvex lens L23 and a biconcave lens L24.

The third lens group G3 is configured of, in order from the object, an aperture stop S, a positive meniscus lens L31 having a convex surface facing the object, and a cemented positive lens in which a biconvex lens L32 and a biconcave lens L33 are cemented.

The fourth lens group G4 is configured of, in order from the object, a cemented positive lens La (corresponding to the first positive lens component in the Claims) in which a positive meniscus lens L41 having a concave surface facing the object and a negative meniscus lens L42 are cemented, a positive meniscus lens (corresponding to the second lens component in the Claims) Lb having a convex surface facing the object, and a negative lens Lc (corresponding to the negative lens component in the Claims) having an aspherical surface facing the object.

In Example 3, the later mentioned antireflection film is formed on the image side lens surface of the positive lens L12 of the first lens group G1, and the image side lens surface of the biconvex lens L23 and the object side lens surface of the biconcave lens L24 of the second lens group G2.

Table 3 shows data of Example 3. The surface numbers 1 to 24 in Table 3 correspond to the optical surfaces of the radius of curvatures R1 to R24 shown in FIG. 6 respectively. In Example 3, Surface 5 and Surface 23 are formed to be aspherical.

TABLE 3

[Surface data]

| Surface number | R | D | nd | vd |
| --- | --- | --- | --- | --- |
| Object surface | ∞ | | | |
| 1 | 53.1301 | 2.0000 | 1.846660 | 23.78 |
| 2 | 34.4788 | 4.0000 | 1.755000 | 52.29 |
| 3 | −1592.1864 | D3(variable) | | |

TABLE 3-continued

| | | | | |
|---|---|---|---|---|
| 4 | 130.1252 | 1.0000 | 1.816000 | 46.63 |
| *5 | 11.5930 | 3.0000 | | |
| 6 | −40.3914 | 1.0000 | 1.816000 | 46.63 |
| 7 | 17.5015 | 0.5000 | | |
| 8 | 14.9985 | 3.0000 | 1.850260 | 32.35 |
| 9 | −19.3436 | 0.2000 | | |
| 10 | −21.6269 | 1.0000 | 1.755000 | 52.29 |
| 11 | 42.8910 | D11(variable) | | |
| 12 | (Stop S) | 0.5280 | | |
| 13 | 13.7052 | 2.0000 | 1.516800 | 64.12 |
| 14 | 132.6864 | 0.0660 | | |
| 15 | 12.2707 | 3.0000 | 1.497820 | 82.56 |
| 16 | −22.2725 | 1.0000 | 1.850260 | 32.35 |
| 17 | 35.8394 | D17(variable) | | |
| 18 | −84.5308 | 2.0000 | 1.755000 | 52.29 |
| 19 | −19.7674 | 1.0000 | 1.518230 | 58.89 |
| 20 | −45.5513 | 0.1000 | | |
| 21 | 13.3653 | 2.0000 | 1.516800 | 64.12 |
| 22 | 28.4375 | 1.0000 | | |
| *23 | 60.0000 | 1.0000 | 1.516800 | 64.12 |
| 24 | 22.2132 | BF | | |
| Image plane | ∞ | | | |

[Aspherical data]

Surface 5

κ = 0.6824, A4 = 7.45410E−05, A6 = 7.51234E−07,
A8 = −1.55086E−08, A10 = 5.32599E−10

Surface 23

κ = −0.1946E+03, A4 = −1.37031E−04, A6 = −4.64625E−06,
A8 = 5.56028E−08, A10 = −5.34034E−10

| | Wide-angle end | Intermediate focal length | Telephoto end |
|---|---|---|---|
| [Various data] Zoom ratio 2.88649 | | | |
| f = | 18.5~ | 35.0~ | 53.4 |
| FNO = | 4.10~ | 5.25~ | 5.88 |
| ω = | 39.11~ | 21.75~ | 14.37 |
| Y = | 14.25~ | 14.25~ | 14.25 |
| TL = | 72.00~ | 84.50~ | 97.90 |
| Σd = | 45.75~ | 45.75~ | 50.93 |
| BF = | 26.25~ | 38.75~ | 46.97 |
| [Lens group distance data] Infinity | | | |
| F | 18.50000 | 35.00001 | 53.40000 |
| D0 | 0.0000 | 0.0000 | 0.0000 |
| D3 | 2.27464 | 9.77066 | 17.81007 |
| D11 | 10.81496 | 4.60011 | 2.10484 |
| D17 | 3.26792 | 1.98675 | 1.62109 |
| BF | 26.25337 | 38.74673 | 46.96728 |
| Intermediate focal point | | | |
| β | −0.03333 | −0.03333 | −0.03333 |
| D0 | 525.5011 | 1001.6009 | 1523.4126 |
| D3 | 1.79090 | 9.41851 | 17.46100 |
| D11 | 11.29870 | 4.95226 | 2.45391 |
| D17 | 3.26792 | 1.98675 | 1.62109 |
| BF | 26.25337 | 38.74673 | 46.96728 |
| Short distance | | | |
| β | −0.07215 | −0.13404 | −0.19485 |
| D0 | 227.9951 | 215.5017 | 202.1027 |
| D3 | 1.23868 | 8.38733 | 15.85927 |
| D11 | 11.85092 | 5.98343 | 4.05564 |
| D17 | 3.26792 | 1.98675 | 1.62109 |
| BF | 26.25337 | 38.74673 | 46.96728 |

[Zoom lens group data]

| Group number | First surface of group | Group focal length |
|---|---|---|
| G1 | 1 | 72.597 |
| G2 | 4 | −11.880 |
| G3 | 13 | 24.107 |
| G4 | 18 | 41.578 |

[Conditional Expressions]

| | |
|---|---|
| $(Rb2−Rb1)/(Rb2+Rb1)=0.361$ | Conditional expression (1) |
| $(−Fc)/F4=1.656$ | Conditional expression (2) |
| $Fab/F4=0.658$ | Conditional expression (3) |
| $(−F2)/Fw=0.642$ | Conditional expression (4) |
| $vdc=64.12$ | Conditional expression (5) |
| $Bfw/Fw=1.419$ | Conditional expression (6) |

As the data in Table 3 shows, the zoom lens ZL3 according to this example satisfies all the conditional expression (1) to (6).

FIG. 7 are graphs showing various aberrations of the zoom lens ZL3 according to Example 3, where FIG. 7A are graphs showing various aberrations of the zoom lens upon focusing on infinity in the wide-angle end state, FIG. 7B are graphs showing various aberrations of the zoom lens upon focusing on infinity in the intermediate focal length state, and FIG. 7C are graphs showing various aberrations of the zoom lens upon focusing on infinity in the telephoto end state. As each graph showing aberrations clarifies, in Example 3, various aberrations, including spherical aberration, curvature of field, astigmatism and coma aberration, are corrected well in each focal length state, from the wide-angle end state to the telephoto end state.

Now the antireflection film (also called "multilayer broadband antireflection film") used for the zoom lens according to this embodiment will be described. FIG. 10 shows an example of the film configuration of the antireflection film. This antireflection film 101 is configured of seven layers, and is formed on an optical surface of an optical member 102, such as a lens. A first layer 101a is formed of aluminum oxide, which is deposited by a vacuum deposition method. A second layer 101b, which is a mixture of titanium oxide and zirconium oxide deposited by a vacuum deposition method, is formed on the first layer 101a. A third layer 101c, which is aluminum oxide deposited by a vacuum deposition method, is formed on the second layer 101b, and a fourth layer 101d, which is a mixture of titanium oxide and zirconium oxide deposited by a vacuum deposition method, is formed on the third layer 101c. A fifth layer 101e, which is aluminum oxide deposited by a vacuum deposition method, is formed on the fourth layer 101d, and a sixth layer 101f, which is a mixture of titanium oxide and zirconium oxide deposited by a vacuum deposition method, is formed on the fifth layer 101e.

Then a seventh layer 101g, which is a mixture of magnesium fluoride and silica, is formed by a wet process on the sixth layer 101f formed like this, thereby antireflection film 101 of this embodiment is completed. A sol-gel method, which is a type of wet process, is used to form the seventh layer 101g. A sol-gel method is a method of transforming sol acquired by mixing raw materials into gel which has no fluidity, by hydrolysis, a polycondensation reaction or the like, and obtaining the product material by heating and decomposing the gel, and in the case of fabricating an optical thin film, an optical thin film material sol is coated onto an optical surface of an optical component, and is dried and solidified to generate a gel film. The wet process is not limited to the sol-gel method, but may be a method to obtain a solid film without going through the gel state.

As described above, the first layer 101a to the sixth layer 101f of the antireflection film 101 are formed by electron beam deposition, which is a dry process, and the seventh layer 101g, which is the top layer, is formed by a wet process using the sol solution prepared by a hydrofluoric acid/magnesium acetate method, according to the following procedure. First using a vacuum deposition apparatus, the aluminum oxide layer to be the first layer 101a, the titanium oxide-zirconium oxide mixed layer to be the second layer 101b, the aluminum oxide layer to be the third layer 101c, the titanium oxide-zirconium oxide mixed layer to be the fourth layer 101d, the aluminum oxide layer to be the fifth layer 101e, and the titanium oxide-zirconium oxide mixed layer to be the sixth layer 101f are sequentially formed on a film deposition surface of the lens (optical surface of the above mentioned optical component 102). After taking the optical component 102 from the deposition apparatus, a sol solution (prepared by a hydrofluoric acid/magnesium acetate method) to which silicon alkoxide is added, is coated on the sixth layer 101f by a spin coat method, whereby the magnesium fluoride-silica mixed layer to be the seventh layer 101g is formed. The following formula (b) is the reaction formula when the sol solution is prepared by a hydrofluoric acid/magnesium acetate method.

$$2HF + Mg(CH_3COO)^2 \rightarrow MgF_2 + 2CH_3COOH \quad (b)$$

The sol solution is used for film deposition after the raw materials are mixed and processed by high temperature heating and aging processing at 140° C. for 24 hours in an autoclave. After the seventh layer 101g is formed, this optical component 102 is heated at 160° C. for one hour in air. By using this sol-gel method, particles (several nm to several tens nm size) are deposited with pores, and the seventh layer 101g is formed.

The optical performance of the optical component having the antireflection film 101 formed like this will be described with reference to the spectral characteristics shown in FIG. 11.

The optical component (lens) having the antireflection film according to this embodiment is formed under the conditions shown in Table 4. Table 4 shows the optical film thickness of each layer 101a (first layer) to 101g (seventh layer) of the antireflection film 101 respectively when the reference wavelength is λ and the refractive index of the substrate (optical component) is 1.62, 1.74 and 1.85 respectively. In Table 4, $Al_2O_3$ is aluminum oxide, $ZrO_2+TiO_2$ is a mixture of titanium oxide and zirconium oxide, and $MgF_2+SiO_2$ is a mixture of magnesium fluoride and silica.

FIG. 11 shows the spectral characteristics when a beam vertically enters the optical component having the antireflection film 101 of which optical film thickness of each layer is designed according to Table 4, with 550 nm for the reference wavelength λ.

As FIG. 11 shows, the optical component having the antireflection film 101 which is designed with 550 nm for the reference wavelength λ can suppress reflectance to 0.2% or less in the entire region, 420 n to 720 nm of the wavelength of the beam. Even in the case of an optical component having the antireflection film 101 of which each optical film thickness is designed assuming d-line (wavelength: 587.6 nm) for the reference wavelength λ, Table 4 shows that the spectral characteristics of the optical component are hardly influenced, and spectral characteristics equivalent to the case of using 550 nm for the reference wavelength λ shown in FIG. 11 can be demonstrated.

TABLE 4

| | Material | Refractive index | Optical film thickness | Optical film thickness | Optical film thickness |
|---|---|---|---|---|---|
| Medium | Air | 1.00 | | | |
| Seventh layer | $MgF_2 + SiO_2$ | 1.26 | 0.268λ | 0.271λ | 0.269λ |
| Sixth layer | $ZrO_2 + TiO_2$ | 2.12 | 0.057λ | 0.054λ | 0.059λ |
| Fifth layer | $Al_2O_3$ | 1.65 | 0.171λ | 0.178λ | 0.162λ |
| Fourth layer | $ZrO_2 + TiO_2$ | 2.12 | 0.127λ | 0.13λ | 0.158λ |
| Third layer | $Al_2O_3$ | 1.65 | 0.122λ | 0.107λ | 0.08λ |
| Second layer | $ZrO_2 + TiO_2$ | 2.12 | 0.059λ | 0.075λ | 0.105λ |
| First layer | $Al_2O_3$ | 1.65 | 0.257λ | 0.03λ | 0.03λ |
| Refractive index of substrate | | | 1.62 | 1.74 | 1.85 |

Now a modification of the antireflection film will be described. This antireflection film is configured of five layers, and just like the case of Table 4, an optical film thickness of each layer at the reference wavelength λ is designed under the conditions shown in Table 5. In this modification, the above mentioned sol-gel method is used for forming the fifth layer.

FIG. 12 shows the spectral characteristics when a beam vertically enters the optical component having the antireflection film of which each optical film thickness is designed according to Table 5, with 1.52 for the refractive index of the substrate, and 550 nm for the reference wavelength λ. As FIG. 12 shows, the antireflection film of this modification can suppress reflectance to 0.2% or less in the entire region 420 nm to 720 nm of the wavelength of the beam. Even in the case of the optical component having the antireflection film of which each optical film thickness is designed assuming d-line (wavelength: 587.6 nm) for the reference wavelength λ, Table 5 shows that the spectral characteristics of the optical component are hardly influenced, and spectral characteristics equivalent to the spectral characteristics shown in FIG. 12 can be demonstrated.

FIG. 13 shows the spectral characteristics when the incident angle of the beam to the optical component having the spectral characteristics shown in FIG. 12 is 30°, 45° and 60° respectively. In FIG. 12 and FIG. 13, the spectral characteristics of the optical component having the antireflection film when the refractive index of the substrate is 1.46 shown in Table 5 are not shown, but are approximately the same as the spectral characteristics when the refractive index of the substrate is 1.52.

TABLE 5

| | Material | Refractive index | Optical film thickness | Optical film thickness |
|---|---|---|---|---|
| Medium | Air | 1.00 | | |
| Fifth layer | $MgF_2 + SiO_2$ | 1.26 | 0.275λ | 0.269λ |
| Fourth layer | $ZrO_2 + TiO_2$ | 2.12 | 0.045λ | 0.043λ |
| Third layer | $Al_2O_3$ | 1.65 | 0.212λ | 0.217λ |
| Second layer | $ZrO_2 + TiO_2$ | 2.12 | 0.077λ | 0.066λ |
| First layer | $Al_2O_3$ | 1.65 | 0.288λ | 0.290λ |
| Refractive index of substrate | | | 1.46 | 1.52 |

For comparison, FIG. 14 shows an example of an antireflection film deposited only by a dry process, such as a conventional vacuum deposition method. FIG. 14 shows the spectral characteristics when a beam vertically enters the optical component having the antireflection film designed under the conditions of Table 6, where the refractive index of the substrate is 1.52, which is the same as Table 5. FIG. 15 shows the spectral characteristics when the incident angle of the beam to the optical component having the spectral characteristics shown in FIG. 14 is 30°, 45° and 60° respectively.

TABLE 6

| | Material | Refractive index | Optical film thickness |
|---|---|---|---|
| Medium | Air | 1.00 | |
| Seventh layer | $MgF_2$ | 1.39 | 0.243λ |
| Sixth layer | $ZrO_2 + TiO_2$ | 2.12 | 0.119λ |
| Fifth layer | $Al_2O_3$ | 1.65 | 0.057λ |
| Fourth layer | $ZrO_2 + TiO_2$ | 2.12 | 0.220λ |
| Third layer | $Al_2O_3$ | 1.65 | 0.064λ |
| Second layer | $ZrO_2 + TiO_2$ | 2.12 | 0.057λ |
| First layer | $Al_2O_3$ | 1.65 | 0.193λ |
| Refractive index of substrate | | | 1.52 |

Compared with the spectral characteristics of the prior art shown in FIG. 14 and FIG. 15, the spectral characteristics of the optical component having the antireflection film according to this embodiment shown in FIG. 11 to FIG. 13 indicate that this antireflection film has low reflectance at any incident angle, and has low reflectance in wider bands.

Now examples when the antireflection film shown in Table 4 is applied to Example 1 to Example 3 of this invention will be described.

In the zoom lens ZL according to Example 1, the refractive index of the positive meniscus lens L12 of the first lens group G1 is nd=1.755000, and the refractive index of the negative meniscus lens L21 of the second lens group G2 is nd=1.816000 as shown in Table 1, therefore if the antireflection film 101 corresponding to the refractive index of the substrate that is 1.74 (see Table 4) is used for the image side lens surface of the positive meniscus lens L12, and the antireflection film corresponding to the refractive index of the substrate that is 1.85 (see Table 4) is used for the object side lens surface of the negative meniscus lens L21, then reflected light from each lens surface can be decreased, and ghosts and flares can be decreased.

In the zoom lens ZL according to Example 2, the refractive index of the negative meniscus lens L21 of the second lens group G2 is nd=1.816000, and the refractive index of the biconcave lens L22 of the second lens group G2 is nd=1.816000, as shown in Table 2, therefore if the antireflection film 101 corresponding to the refractive index of the substrate that is 1.85 (see Table 4) is used for the image side lens surface of the negative meniscus lens L21, and the antireflection film corresponding to the refractive index of the substrate that is 1.85 (see Table 4) is used for the object side lens surface of the biconcave lens L22, then reflected light from each lens surface can be decreased, and ghosts and flares can be decreased.

In the zoom lens ZL according to Example 3, the refractive index of the positive lens L12 of the first lens group G1 is nd=1.755000, the refractive index of the biconvex lens L23 of the second lens group G2 is nd=1.850260, and the refractive index of the biconcave lens L24 of the second lens group G2 is nd=1.755000, as shown in Table 3, therefore if the antireflection film 101 corresponding to the refractive index of the substrate that is 1.74 (see Table 4) is used for the image side lens surface of the positive lens L12, the antireflection film corresponding to the refractive index of the substrate that is 1.85 (see Table 4) is used for the image side lens surface of the biconvex lens 123, and the antireflection film corresponding to the refractive index of the substrate that is 1.74 (see Table 4) is used for the object side lens surface of the biconcave lens L24, then reflected light from each lens surface can be decreased, and ghosts and flares can be decreased.

According to each of the above examples, features of a zoom lens to be implemented are: the included angle in the wide-angle end state exceeds 2ω=78.2°, aperture is about F4 to 5.6, relatively compact and short front lens diameter; high performance; various aberrations including spherical aberration, curvature of field, astigmatism and coma aberration are corrected well; and ghosts and flares are decreased. Each of the above mentioned examples is merely illustrative, and are not intended to limit the scope of the zoom lens according to this embodiment.

In the above embodiment, the following content can be adopted within a range where the optical performance is not diminished.

In each example, the zoom lens is configured of four lens groups, but the present invention can also be applied to a configuration using a different number of lens groups, such as five lens groups or six lens groups. In the configuration, a lens or a lens group may be added to the side closest to the object, or a lens or a lens group may be added to the side closest to the image. A "lens group" refers to a portion having at least one lens isolated by an air gap which changes upon zooming.

In this embodiment, a single or plurality of lens group(s) or a partial lens group may be designed to be a focusing lens group which performs focusing from an object at infinity to an object at short distance by moving in the optical axis direction. This focusing lens group can be applied to auto focus, and is also suitable for driving a motor for auto focusing (driving using an ultrasonic motor). It is particularly preferable that the second lens group is designed to be a focusing lens group.

In this embodiment, a lens group or a partial lens group may be designed to be a vibration-isolating lens group, which corrects image blurs generated by hand motion by moving the lens group or the partial lens group in a direction perpendicular to the optical axis or rotating (oscillating) the lens group or the partial lens group in an in-plane direction including the optical axis. It is particularly preferable that at least a part of the third lens group is designed to be a vibration-isolating lens group.

In this embodiment, the lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

In this embodiment, it is preferable that the aperture stop is disposed near the third lens group, but the role of the aperture stop may be substituted by the frame of the lens, without disposing a separate element as the aperture stop.

In this embodiment, each lens surface may be coated with an antireflection film which has high transmittance in a wide wavelength region, in order to decrease ghosts and flares, and implement a high optical performance at high contrast.

As described above, according to the present invention, a zoom lens which is miniaturized and has a small filter system, constituted by a small number of lenses, has high performance and little aberrations including curvature of field, coma aberration, spherical aberration and astigmatism, and has less ghosts and flares, an imaging device including this zoom lens, and a method for manufacturing this zoom lens can be provided.

Although the present invention has been described with reference to the configuration requirements of the embodiments, the present invention shall not be limited to this description.

EXPLANATION OF NUMERALS AND CHARACTERS

ZL (ZL1 to ZL3) zoom lens
G1 first lens group
G2 second lens group
G3 third lens group
G4 fourth lens group
La first positive lens component
Lb second positive lens component having a convex surface facing the object
Lc negative lens component
S aperture stop
1 mirrorless camera (imaging device)
2 camera lens (zoom lens)
I image plane
101 antireflection film
101a first layer

The invention claimed is:
1. A zoom lens comprising, in order from an object:
a first lens group having positive refractive power;
a second lens group having negative refractive power;
a third lens group having positive refractive power; and
a fourth lens group having positive refractive power,
performing zooming by changing an air gap between the lens groups,
the fourth lens group including, in order from the object, a first positive lens component, a second positive lens component having a convex surface facing the object, and a negative lens component, the first positive lens component, the second positive lens component and the negative lens component being at least partially spaced from each other by air gaps, and
the following conditional expression being satisfied:

$0.00 < (Rb2-Rb1)/(Rb2+Rb1) < 1.00$ where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, the following conditional expression being satisfied:

$0.50 < (-F2)/Fw < 2.00$ where F2 denotes a focal length of the second lens group and Fw denotes a focal length of the zoom lens upon focusing on infinity in the wide-angle end state, and the following conditional expression being satisfied:

$0.45 < (-Fc)/F4 < 3.00$ where Fc denotes a focal length of the negative lens component constituting the fourth lens group, and F4 denotes a focal length of the fourth lens group.

2. The zoom lens according to claim 1, wherein an antireflection film is formed on at least one surface out of the optical surfaces of the first lens group and the second lens group, and the antireflection film includes at least one layer that is formed by a wet process.

3. The zoom lens according to claim 2, wherein the antireflection film is a multilayer film, and the layer formed by the wet process is a layer closest to the surface out of the layers constituting the multilayer film.

4. The zoom lens according to claim 2, wherein a refractive index nd, which is a refractive index of the layer formed by the wet process at d-line, is 1.30 or less.

5. The zoom lens according to claim 2, wherein the third lens group has an aperture stop, and the optical surface on which the antireflection film is formed is a concave surface when viewed from the aperture stop.

6. The zoom lens according to claim 5, wherein the lens surface that is concave when viewed from the aperture stop is an image side lens surface of at least one lens included in the first lens group and the second lens group.

7. The zoom lens according to claim 5, wherein the lens surface that is concave when viewed from the aperture stop is an object side lens surface of at least one lens included in the first lens group and the second lens group.

8. The zoom lens according to claim 2, wherein the optical surface on which the antireflection film is formed is a concave surface when viewed from the object.

9. The zoom lens according to claim 8, wherein the lens surface that is concave when viewed from the object is an image side lens surface of a lens that is the second component of the first lens group.

10. The zoom lens according to claim 8, wherein the lens surface that is concave when viewed from the object is an object side lens surface of a lens that is the second component of the second lens group.

11. The zoom lens according to claim 8, wherein the lens surface that is concave when viewed from the object is an image side lens surface of a lens that is the third component of the second lens group.

12. The zoom lens according to claim 8, wherein the lens surface that is concave when viewed from the object is an object side lens surface of a lens that is the fourth component of the second lens group.

13. The zoom lens according to claim 1, wherein the following conditional expression is satisfied:

$0.10 < Fab/F4 < 2.00$ where Fab denotes a combined focal length of the first positive lens component and the second positive lens component having the convex surface facing the object, which constitute the fourth lens group, and F4 denotes a focal length of the fourth lens group.

14. The zoom lens according to claim 1, wherein the following conditional expression is satisfied:

$45 < vdc < 85$ where vdc denotes an Abbe number of the negative lens component constituting the fourth lens group.

15. The zoom lens according to claim 1, wherein the following conditional expression is satisfied:

$0.5 < Bfw/Fw < 2.0$ where Bfw denotes a back focus of the zoom lens upon focusing on infinity in the wide-angle end state, and Fw denotes a focal length of the zoom lens upon focusing on infinity in the wide-angle end state.

16. The zoom lens according to claim 1, wherein the fourth lens group has at least one aspherical surface.

17. The zoom lens according to claim 1, wherein the negative lens component constituting the fourth lens group has at least one aspherical surface.

18. The zoom lens according to claim 1, wherein focusing of the zoom lens on a short distance object is performed by moving, on the optical axis, the second lens group having negative refractive power.

19. An imaging device comprising the zoom lens according to claim 1.

20. A method for manufacturing a zoom lens comprising, in order from an object, a first lens group having positive refractive power, a second lens group having negative refractive power, a third lens group having positive refractive power, and a fourth lens group having positive refractive power, the method comprising:
performing zooming by changing an air gap between the lens groups,
the fourth lens group including, in order from the object, a first positive lens component, a second positive lens component having a convex surface facing the object, and a negative lens component, the first positive lens component, the second positive lens component and the negative lens component being at least partially spaced from each other by air gaps, and
the method further comprising:
assembling each lens in a lens barrel so that the following conditional expression is satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, so that
the following conditional expression is satisfied:

$$0.50<(-F2)/Fw<2.00$$

where F2 denotes a focal length of the second lens group and Fw denotes a focal length of the zoom lens upon focusing on infinity in the wide-angle end state, and so that
the following conditional expression is satisfied:

$$0.45<(-Fc)/F4<3.00$$

where Fc denotes a focal length of the negative lens component constituting the fourth lens group, and F4 denotes a focal length of the fourth lens group.

21. A zoom lens comprising, in order from an object:
a first lens group having positive refractive power;
a second lens group having negative refractive power;
a third lens group having positive refractive power; and
a fourth lens group having positive refractive power,
performing zooming by changing an air gap between the lens groups,
the fourth lens group including, in order from the object, a first positive lens component, a second positive lens component having a convex surface facing the object, and a negative lens component,
the following conditional expression being satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, and
the following conditional expression being satisfied:

$$1.031 \leq (-Fc)/F4<3.00$$

where Fc denotes a focal length of the negative lens component constituting the fourth lens group, and F4 denotes a focal length of the fourth lens group.

22. A zoom lens comprising, in order from an object:
a first lens group having positive refractive power;
a second lens group having negative refractive power;
a third lens group having positive refractive power; and
a fourth lens group having positive refractive power,
performing zooming by changing an air gap between the lens groups,
the fourth lens group including, in order from the object, a first positive lens component, a second positive lens component having a convex surface facing the object, and a negative lens component, the first positive lens component, the second positive lens component and the negative lens component being at least partially spaced from each other by air gaps, the second positive lens component being the only lens component between the first positive lens component and the negative lens component, and
the following conditional expression being satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, and
the following conditional expression being satisfied:

$$0.538 \leq Fab/F4<2.00$$

where Fab denotes a combined focal length of the first positive lens component and the second positive lens component having the convex surface facing the object, which constitute the fourth lens group, and F4 denotes a focal length of the fourth lens group.

23. A zoom lens consisting of, in order from an object:
a first lens group having positive refractive power;
a second lens group having negative refractive power;
a third lens group having positive refractive power; and
a fourth lens group having positive refractive power,
performing zooming by changing an air gap between the lens groups,
the fourth lens group consisting of, in order from the object, a first positive lens component, a second positive lens component having a convex surface facing the object, and a negative lens component, the first positive lens component, the second positive lens component and the negative lens component being at least partially spaced from each other by air gaps, and the following conditional expression being satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object.

24. A method for manufacturing a zoom lens comprising, in order from an object, a first lens group having positive refractive power, a second lens group having negative refractive power, a third lens group having positive refractive power, and a fourth lens group having positive refractive power, the method comprising:
performing zooming by changing an air gap between the lens groups,
the fourth lens group including, in order from the object, a first positive lens component, a second positive lens component having a convex surface facing the object, and a negative lens component, and
the method further comprising:
assembling each lens in a lens barrel so that the following conditional expression is satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, and so that
the following conditional expression is satisfied:

$$1.031 \leq <(-Fc)/F4<3.00$$

where Fc denotes a focal length of the negative lens component constituting the fourth lens group, and F4 denotes a focal length of the fourth lens group.

25. A method for manufacturing a zoom lens comprising, in order from an object, a first lens group having positive refractive power, a second lens group having negative refractive power, a third lens group having positive refractive power, and a fourth lens group having positive refractive power, the method comprising:
performing zooming by changing an air gap between the lens groups,
the fourth lens group including, in order from the object, a first positive lens component, a second positive lens component having a convex surface facing the object, and a negative lens component, the first positive lens component, the second positive lens component and the negative lens component being at least partially spaced from each other by air gaps, the second positive lens component being the only lens component between the first positive lens component and the negative lens component, and
the method further comprising:
assembling each lens in a lens barrel so that the following conditional expression is satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object, and so that
the following conditional expression is satisfied:

$$0.538 \leq Fab/F4<2.00$$

where Fab denotes a combined focal length of the first positive lens component and the second positive lens component having the convex surface facing the object, which constitute the fourth lens group, and F4 denotes a focal length of the fourth lens group.

26. A method for manufacturing a zoom lens consisting of, in order from an object, a first lens group having positive refractive power, a second lens group having negative refractive power, a third lens group having positive refractive power, and a fourth lens group having positive refractive power, the method comprising:
performing zooming by changing an air gap between the lens groups,
the fourth lens group consisting of, in order from the object, a first positive lens component, a second positive lens component having a convex surface facing the object, and a negative lens component, the first positive lens component, the second positive lens component and the negative lens component being at least partially spaced from each other by air gaps, and
the method further comprising:
assembling each lens in a lens barrel so that the following conditional expression is satisfied:

$$0.00<(Rb2-Rb1)/(Rb2+Rb1)<1.00$$

where Rb2 denotes a radius of curvature of an image side surface of the second positive lens component which constitutes the fourth lens group and has the convex surface facing the object, and Rb1 denotes a radius of curvature of an object side surface of the second positive lens component which constitutes the fourth lens group and has the convex surface facing the object.

* * * * *